(12) United States Patent  
Yehuda et al.

(10) Patent No.: US 7,730,428 B1  
(45) Date of Patent: Jun. 1, 2010

(54) METHODS AND APPARATUS FOR DISPLAYING STORAGE RESOURCES

(75) Inventors: Hanna Yehuda, Newton, MA (US); James M. Apple, Pascaog, RI (US)

(73) Assignee: EMC Corporation, Hopkinton, MA (US)

( * ) Notice: Subject to any disclaimer, the term of this patent is extended or adjusted under 35 U.S.C. 154(b) by 1683 days.

(21) Appl. No.: 10/879,688

(22) Filed: Jun. 29, 2004

(51) Int. Cl.
G06F 15/00 (2006.01)
G06F 13/00 (2006.01)

(52) U.S. Cl. ...................... 715/853; 715/857
(58) Field of Classification Search ......... 715/853–854, 715/857–858, 825–826, 733, 783
See application file for complete search history.

(56) References Cited

U.S. PATENT DOCUMENTS 7,290,222 B2 * 10/2007 Guido et al. ................. 715/853

2004/0075680 A1 * 4/2004 Grace et al. ................. 345/734

* cited by examiner

Primary Examiner—Cao (Kevin) Nguyen  
(74) Attorney, Agent, or Firm—Chapin IP Law, LLC

(57) ABSTRACT

A resource manager receives selection of a particular icon from an expandable tree of icons displayed in a first region of a display screen. The selected particular icon represents a corresponding group of resources associated with a storage area network. In response to receiving the selection, the resource manager displays a set of selectable view mode icons in a second region of the display screen. The set of selectable view mode icons enable a user to select different subsets of resources from the corresponding group of resources in the first region for viewing in a table. The table is also displayed in the second region of the display screen. After initially populating the table, the resource manager provides the selectable view mode icons in the second region of the display screen along with the table to enable further selection of different subsets of resources for viewing in the table.

32 Claims, 11 Drawing Sheets

METHODS AND APPARATUS FOR DISPLAYING STORAGE RESOURCES

RELATED APPLICATIONS

This application is related to co-pending U.S. patent application Ser. No. 10/879,687 entitled "METHODS AND APPARATUS FOR DISPLAYING STORAGE RESOURCES," by Hanna Yehuda and James M. Apple, which is being filed on the same date as the present application. This application is also related to co-pending U.S. patent application Ser. No. 10/880,431 entitled "METHODS AND APPARATUS FOR VIEWING NETWORK RESOURCES," by Hanna Yehuda and James M. Apple, which is being filed on the same date as the present application. The entire teachings of both of these applications are incorporated herein by this reference.

BACKGROUND

The rapid expansion of information service and data processing industries has created a need to manage and store large amounts of data. As an example, financial service companies such as banks, mutual fund companies or the like often operate complex data processing systems that require access to many hundreds of gigabytes or even terabytes of data and files stored in remotely located, high capacity data storage systems. Typically, data processing systems retrieve the data and files from the data storage systems over a network.

Data storage system developers have responded to these increased capacity of data storage needs by integrating high capacity data storage systems, data communications devices and computer systems into networks referred to as "storage networks" or "storage area networks" (SANs.) In general, a storage area network is a collection of data storage systems that are networked with a number of host computer systems. The host computers of the storage area network operate as servers that access data stored in the data storage systems on behalf of client computers that request data from the servers.

Storage area networks are typically managed based on use of software management applications running on a corresponding network manager control station (e.g., a computer workstation) coupled to the storage area network. Conventional storage area network management applications (i.e., certain software applications) provide conventional Graphical User Interfaces (GUIs) that enable network managers to graphically manage, control and configure various types of hardware and software resources associated with a corresponding managed storage area network. One conventional network management storage application generates a graphical user interface utilized by a network manager to graphically select, interact with, and manage local or remote devices and associated software processes associated with the storage area network.

Based on use of a graphical user interface in combination with an input device such as a hand operated mouse and corresponding pointer displayed on a viewing screen, a network manager is able to manage hardware and software entities such as file systems, databases, storage devices, peripherals, network data communications devices, etc., associated with the storage area network. Typically, in such network management applications, the network manager selects a displayed icon representing a corresponding managed resource in the network and applies management commands to carry out intended management functions such as viewing hardware and software settings associated with the corresponding selected managed resource.

As noted above, a storage area network may include a number of hardware devices such as host computers, servers, data communication devices (e.g., switches, routers, etc.), network attached storage devices, proxy devices, firewall devices, and so forth that are coupled amongst each other via physical cables, circuitry, etc. Certain conventional network management applications are designed to provide a network manager with information concerning how these network resources are interrelated. For example, in one application, a network manager may select one or more icons (e.g., folders of information identifying host computers, servers, volumes, storage devices, etc.) from a hierarchical tree to display managed resources associated with a particular storage system. Based on viewing information in the hierarchical tree and/or a table of information generated based on selection of an entry in the hierarchical tree of SAN resources, the network manager can view and modify configuration settings of a corresponding managed storage area network.

SUMMARY

Conventional network management applications that support management of network resources suffer from a number of deficiencies. As discussed, certain conventional network management applications enable a network manager to display a hierarchy of icons representing managed resources associated with a storage system. Based on selection of an icon (i.e., managed entity) in the hierarchy of icons, the network manager may attempt to display information on a display screen for viewing. Unfortunately, during the process of selecting, the network manager may select a particular folder in a hierarchical tree including attributes that are not easily displayed in the corresponding hierarchy of icons. In the event that attributes associated with a selected icon in the hierarchy are displayable, the network manager can scroll down a list of items in a folder of the hierarchy to locate entries of particular interest. However, the network manager may be interested in viewing only certain types of resources or sub-resources associated with a selected folder. Viewing different entries or searching for a particular type of resource in the hierarchy of icons via scrolling can be cumbersome, especially when a user wishes to compare multiple resource entries with each other or look at resources of a particular type. This problem typically occurs when managing resources in a high capacity storage area network because a folder (i.e., a managed network resource) may contain hundreds or even thousands of entries of corresponding managed entities associated with a storage area network.

Certain conventional network management applications enable a network manager to display associations among network resources in a storage area network. For example, based on methods as previously discussed, a network manager can click on an icon in a first hierarchical tree to display configuration information in a second produced hierarchical tree associated with a "clicked" upon icon. However, such conventional network management applications do not enable a network manager to quickly and efficiently display information associated with particular managed resources of interest because the network manager is quite often restricted to only viewing entries in either one of the expandable trees of icons.

Embodiments of the invention significantly overcome the aforementioned and other deficiencies of conventional network management applications. In particular, embodiments of the invention include mechanisms and techniques for displaying network resources via use of a graphical user interface rendered on a computer display screen. In one embodiment of the invention, the graphical user interface enables a user such as a network manager to selectively display different types of information on a viewing screen via selection of one of multiple view mode icons. The GUI utilizes the selection of a view mode icon to identify a subset of information to be displayed on a display screen for viewing by a user. For example, the GUI populates a table of information depending on which of multiple viewing mode icons (which are associated with a selected entry of an expandable tree) has been selected by a user. Maintaining view mode icons in relation to the table while the table displays a certain type of selected information enables the user to quickly and efficiently change which information is displayed in the table. For example, a user can select one view mode icon to populate the table with a certain type of information. Thereafter, the user can select another icon to populate the table with different information. Conventional applications are limited to picking an entry in a hierarchy of icons for viewing only a single folder of information. Thus, there is no easy way of employing conventional methods to selectively view different types of information associated with a particular folder selected from an expandable tree. Certain embodiments of the invention extend to network management software incorporating the functionality as explained herein, as well as to computerized devices configured to operate as explained herein.

Thus, embodiments of the invention thus allow a network manager to selectively view storage system resources and corresponding sub-resources such as storage area network components configured within a storage system. The storage system components (e.g., hardware, software, configuration information, etc.) can be displayed in a tabular view (e.g., a table) including host resources (e.g., host computer, host adapters, and host adapter ports), switch resources (e.g., switches and switch ports) and storage device resources (i.e., storage system or storage array) and other resources (e.g., storage systems, storage adapters and storage adapter ports). Embodiments of the invention thus allow a network administrator to select, for example, which resources shall be viewed on a display screen.

In view of the aforementioned embodiments, one embodiment of the invention involves a technique of utilizing a resource manager (e.g., an application executed by a processor, a processor function, etc.) to display an expandable tree of icons in a first region of a display screen. The icons in the expandable tree represent managed resources (hardware, software, configuration settings, etc.) associated with a system such as a storage area network. During operation, the resource manager receives a selection of a particular icon from the expandable tree of icons displayed in the first region. The selected particular icon represents a corresponding particular group of resources associated with the storage area network. In response to receiving the selection, the resource manager displays a set of selectable view mode icons in a second region of the display screen. The set of selectable view mode icons enables a user to select different subsets of resources from the corresponding particular group of resources in the first region for viewing in a table in the second region of the display screen. During operation, the resource manager further receives a selection from the set of selectable view mode icons in the second region of the display screen. Depending on the selection from the set of selectable view mode icons in the second region, the resource manager populates the table in the second region of the display screen with a corresponding selected subset of the particular group of resources associated with the storage area network in the first region of the display screen. The resource manager provides the selectable view mode icons in the second region of the display screen along with the table to enable further selection of different subsets of resources for viewing in the table. Thus, a first view mode may be selected based on selection of a first icon and corresponding type of resource to be viewed; a second view mode may be selected based on selection of a second icon and corresponding type of resource to be viewed, and so on. Consequently, a user can select a resource entry in the first region of the display screen and click on the view mode icons in the second region to selectively display different resources in the table on the display screen. Simultaneous presentation of the selectable view mode icons (e.g., selectable tabs) along with display of the table enables a user to further narrow or change which type of resource or sub-resource associated with an initially selected resource in the first region of the display screen shall be expanded for viewing in the table in the second region. This overall process of supporting selectable view modes alleviates the user from having to scroll through an entire list of managed resources to identify which resources are important for viewing by the user. Also, the resource manager need only populate an already displayed table to provide any newly requested information to a user viewing the display screen rather than completely change the table.

In further more specific embodiments and potentially other independent embodiments of the invention, the resource manager provides a vertical hierarchy of expandable icons in the first region of the display screen. The vertical hierarchy of expandable icons includes an icon that is not locally expandable in the first region but is remotely expandable in a second region of the display screen. When the icon is selected, the resource manager generates and populates the table in the second region of the display screen with corresponding information associated with the selected icon. This simplifies viewing of the information because the resource manager displays (e.g., provides exploded view) the information in the second region of the display screen rather than in the expandable tree in the first region. Thus, a user can view sub-resources associated with a selected resource in a different window than the window from which the resource is originally selected. This renders it easier to view the sub-resources that could otherwise be difficult to view beneath a selected icon in the hierarchical tree in the first region of the display.

In furtherance of the embodiment discussed above, the resource manager displays a non-expandable icon (e.g., an icon in the first region of the display screen that represents a folder of information that does not lend itself to viewing in the first region of the display screen) in the expandable tree displayed in the first region of the display screen. The at least one non-expandable icon represents a resource in the storage area network having other associated sub-resources that are not displayable beneath the non-expandable icon in the first region of the display screen. During operation, the resource manager receives a selection of a particular non-expandable icon in the first region of the display screen. In response to receiving the selection of the particular non-expandable icon in the first region, the resource manager displays sub-resources associated with the particular non-expandable icon in the second region of the display screen instead of under the particular non-expandable icon in the first region.

In other embodiments, the table displayed in the second region of the display screen supports additional features to more efficiently display information to a viewer. For example, according to one embodiment, the resource manager provides expandable icons in the table displayed in the second region of the display screen. The expandable icons in the table represent at least a portion of the corresponding particular group of resources associated with the selected particular icon in the first region of the display screen. Selection of an expandable icon in the table results in a further display by the resource manager of a set of additional sub-resources associated with a selected expandable icon in the table.

According to one embodiment, the resource manager displays the table including columns and rows to display resource information associated with the selected particular icon in the first region of the display screen as well as a view mode icon in the second region of the display screen. The resource manager utilizes the columns of the table to display different types of status information associated with corresponding resource entries in rows of the table depending on selection of a view mode icon. For example, the columns of the table display different types of status or configuration information associated with a corresponding resource entry in a row of the table. Thus, a user can view a particular resource entry in a column of the table and scan across a row of the table to view corresponding information associated with the particular resource entry. In one application, the resource manager displays a resource entry in a row of the table as an expandable icon that, when clicked upon, produces a further view of additional resource information below a corresponding selected icon in the row of the table. In other words, one or more columns of the table can include a set of expandable icons similar in some respects to a vertical hierarchy of icons as displayed in the first region of the display screen. The table expands as a result of selecting an expandable icon.

In one embodiment, the resource manager provides a header in a top row of the table to identify types of information potentially displayed in columns of the table. For a row in the table, the resource manager selectively populates corresponding columns of the table with information depending on which of the view mode icons has been selected by a user. In one application, at least one of the column entries associated with the row is not populated with information for a particular entry because not all columns are populated with information depending on a selected view mode.

According to another embodiment, in response to receiving a selection of a resource entry in the table displayed in the second region, the resource manager generates a table in a third region of the display screen to display additional resource information associated with the selection of the resource entry of the table in the second region of the display screen. The resource manager highlights the resource entry in the table displayed in the second region to indicate to which resource the table in the third region pertains. Thus, a user viewing the display screen can easily identify which entry of the table in the second region pertains to the table in the third region.

According to another embodiment of the invention, the resource manager displays the set of selectable view mode icons as a row of linearly disposed sequence of selectable icons in the second region of the display screen to enable a user to view different types of sub-resource information associated with the selected particular icon in the first region of the display screen. The resource manager receives selection of a particular view mode of the table based on selection of one of the selectable view mode icons in the second region of the display screen. In response to the selection of the view mode icon, the resource manager populates the table in the second region with a particular type of resource associated with the particular view mode. To aid a user viewing the display screen and resource relationships therein, the resource manager provides an indication in the expandable tree of icons in the first region which corresponding resources are displayed in the table in the second region of the display screen.

According to yet another embodiment, the resource manager displays in the second region of the display screen: i) a set of selectable view mode icons that directly correspond to entries in the expandable tree in the first region of the display screen, and ii) a set of selectable view mode icons that do not directly correspond to any entries in the expandable tree in the first region of the display screen. This provides increased flexibility for displaying information associated with a selected icon in the first region of the display screen. The resource manager labels each of the selectable view mode icons with an identifier of a corresponding type of sub-resource associated with the selected particular icon in the first region of the display screen. Thus, a user viewing the view mode icons can identify what type of resource shall be displayed when a clicking on a particular view mode icon. During operation, the resource manager receives, from a user, selection of a particular view mode based on activation (e.g., clicking by a hand-held mouse) of one of the selectable view mode icons. In response to receiving selection by a user of a particular view mode, the resource manager displays the corresponding type of sub-resources associated with the selected particular icon in the table.

According to one embodiment, the resource manager also provides numerical values in relation to corresponding identifiers in the selectable view mode icons. The numerical values identify how many sub-resources of a particular type, as identified by a corresponding identifier, are associated with a particular view mode icon. Consequently, a user can quickly review the numerical values displayed on the view mode icons to identify how many sub-resources are associated with corresponding types of resources also identified by the view mode icons. As discussed, the processor receives, from a user, selection of a particular view mode based on activation of one of the view mode icons. In response to receiving selection of the particular view mode, the resource manager displays the corresponding type of sub-resources associated with the selected one or more resources in the second region of the display screen.

Further embodiments of the invention are directed towards displaying the view mode icons in relation to a table for viewing as discussed above. For example, in a first region of a display screen, the resource manager displays an expandable tree of icons. The resource manager receives a selection of a particular icon from the expandable tree of icons displayed in the first region, the selected particular icon representing at least one resource operable within a storage area network. In response to receiving the selection, the resource manager displays a linearly arranged sequence of selectable view mode icons in a second region of the display screen. Each view mode icon indicates a respective different type of storage area network information available for viewing and that is associated with the selected particular icon from the expandable tree of icons in the first region. In response to a selection of a first view mode icon in the linearly arranged sequence of selectable view mode icons, the resource manager displays a first type of storage area network information associated with a first view mode icon in a first table graphically associated with the first view mode icon. The resource manager also displays the linearly arranged sequence of selectable view mode icons in the second region of the display screen along with the first table. In response to a selection of a second view mode icon in the linearly arranged sequence of selectable view mode icons, the network manager displays a second type of storage area network information associated with the second view mode icon in a second table (e.g., the same table but populated with different information) graphically associated with the second view mode icon, the second table being displayed in place of the first table. The resource manager maintains the display of the linearly arranged sequence of selectable view mode icons in the second region of the display screen, along with the first table, so that a user may select a different viewing mode and which information is displayed in the table.

As discussed, techniques of the invention are well suited for use in applications in which a network manager or user manages a storage area network including many managed resources that are not easily displayed in an expandable hierarchical tree. However, it should be noted that embodiments of the invention are not limited to use in such applications and, thus, embodiments of the invention are well suited for other applications as well.

Other embodiments of the invention include a computerized device (e.g., a host computer, workstation, etc.) configured to support the aforementioned method operations disclosed herein as embodiments of the invention to provide selectable viewing modes as discussed. In such embodiments, the computerized device includes a display, a memory system, a processor (e.g., a processing device) and an interconnect. The interconnect supports communications among the display, the processor and the memory system. The memory system is encoded with a resource management application (e.g., resource manager) that, when executed on the processor, produces a resource management process that includes a graphical user interface produced on the display of the computerized device. The graphical user interface allows the resource management process to perform any of the method embodiments and operations explained herein.

Yet other embodiments of the invention disclosed herein include software programs to perform the method embodiment and operations summarized above and disclosed in detail below under the heading Detailed Description of Preferred Embodiments. More particularly, a computer program product (e.g., a computer-readable medium) including computer program logic encoded thereon may be executed on a computerized device to support generation and display of filter views and associated operations as explained herein. The computer program logic, when executed on one or more processor devices or logic devices in a computing system, causes the devices to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention.

One more particular embodiment of the invention is directed to a computer program product that includes a computer readable medium having instructions stored thereon for supporting management of network resources. The instructions, when carried out by a processor of the first data communication device, cause the processor to perform the steps of: i) in a first region of a display screen, displaying an expandable tree of icons, ii) receiving a selection of a particular icon from the expandable tree of icons displayed in the first region, the selected particular icon representing a corresponding particular group of resources associated with the storage area network, iii) in response to receiving the selection, displaying a set of selectable view mode icons in a second region of the display screen, the set of selectable view mode icons enabling a user to select different subsets of resources from the corresponding particular group of resources for viewing in a table in the second region of the display screen, and iv) providing the selectable view mode icons in the second region of the display screen along with the table to enable further selection of different subsets of resources for viewing in the table. Other embodiments of the invention include software programs to perform any of the method embodiment steps and operations summarized above and disclosed in detail below.

It should be understood that the system of the invention can be embodied as a software program or as a software program operating in conjunction with corresponding hardware. Example embodiments of the invention may be implemented within EMC's Control Center (ECC) software application that provides graphical management functionality for storage area network resources and in computerized devices that operate the Control Center (ECC) software. Control Center software is manufactured by EMC Corporation of Hopkinton, Mass., USA.

BRIEF DESCRIPTION OF THE DRAWINGS

The foregoing and other objects, features, and advantages of the invention will be apparent from the following more particular description of preferred embodiments of the invention, as illustrated in the accompanying drawings in which like reference characters refer to the same parts throughout the different views. The drawings are not necessarily to scale, with emphasis instead being placed upon illustrating the embodiments, principles and concepts of the invention.

DETAILED DESCRIPTION OF PREFERRED EMBODIMENTS

According to one embodiment of the invention, a resource manager receives selection of a particular icon from an expandable tree of icons displayed in a first region of a display screen. The selected particular icon represents a corresponding group of resources associated with a storage area network. In response to receiving the selection, the resource manager displays a set of selectable view mode icons in a second region of the display screen. The set of selectable view mode icons enable a user to select different subsets of resources from the corresponding group of resources in the first region for viewing in a table. The table is also displayed in the second region of the display screen. After initially populating the table, the resource manager provides the selectable view mode icons in the second region of the display screen along with the table to enable further selection of different subsets of resources for viewing in the table. The resource manager populates column headings in the table with different identifiers depending on which view mode icon has been selected.

Figure 1:
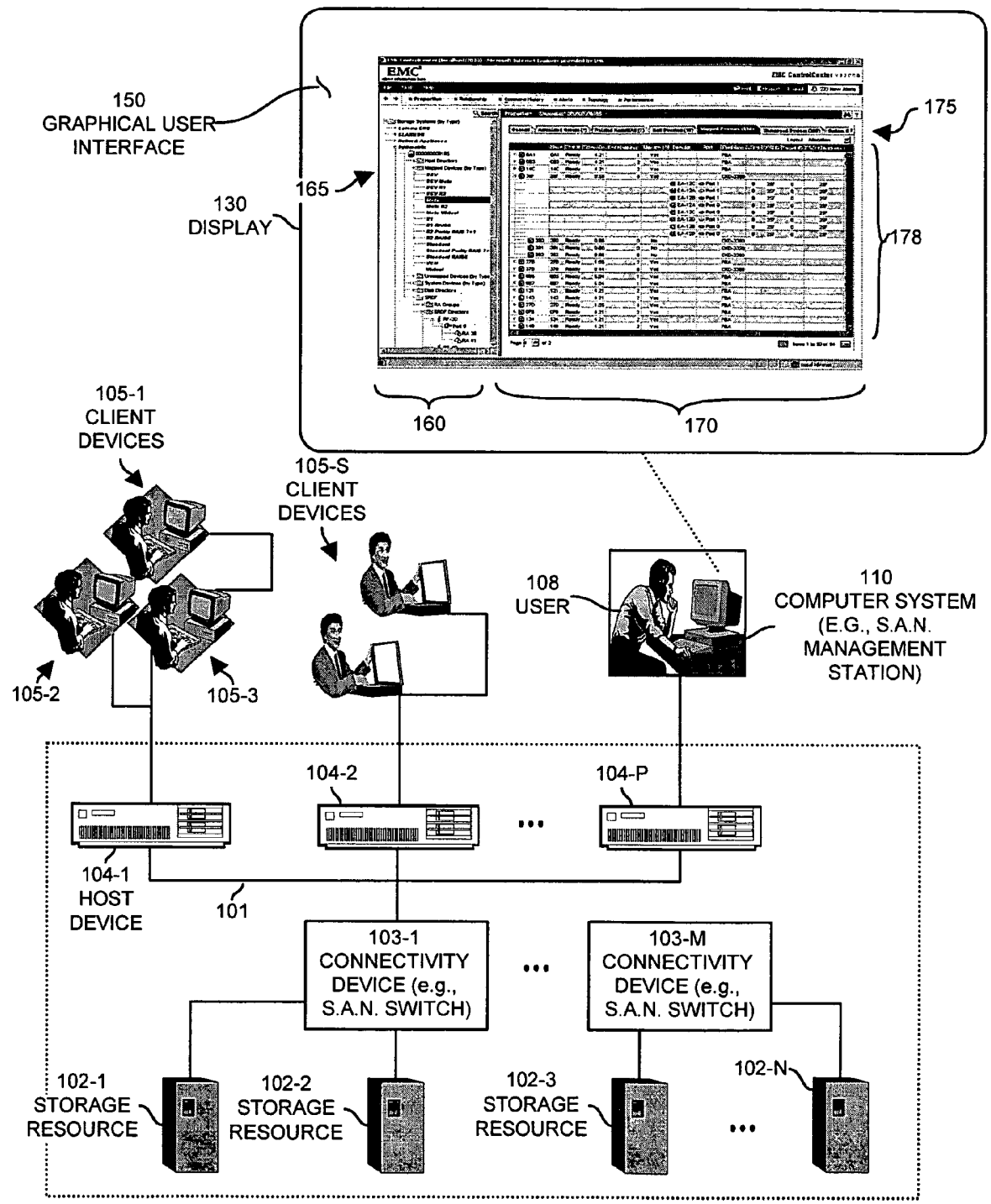
FIG. 1 is a block diagram of a storage area network and management station configured to operate according to an embodiment of the invention.

FIG. 1 illustrates a network system 100 (e.g., a storage area network) suitable for explaining further operations of example embodiments of the invention. As shown, the network system 100 includes a network medium 101 such as a high-speed data communications medium (e.g., Ethernet, optical network, or other type of network) that interconnects a plurality of components such as storage resources 102-1, 102-2, ... 102-N, storage area network switches 103-1, ... 103-M (i.e., connectivity devices), host devices (e.g., host servers) 104-1, 104-2, ... 104-P, client devices 105-1, 105-2, ... 105-S, and computer system 110 (e.g., a storage area network management station).

Computer system 110 is configured, in this example, as a storage area network management station operated by network manager or user 108 (e.g., a user responsible for managing the resources within the storage area network 100). Computer system 110 executes a resource manager application 120 (e.g., a software graphical user interface application more particularly shown in FIG. 2) that generates and displays information in accordance with embodiments of the invention as will be explained herein. The resource manager 120 in this example may be any type of network management software application that executes, performs or otherwise operates within the management station computerized system 110. It should be noted that computer system 110 may include certain other components such as one or more internal devices as well as software applications or processes that operate within or in conjunction with the illustrated components and devices in FIG. 1.

As shown towards the top of FIG. 1, the management station computer system 110 (e.g., a computer device) includes a corresponding display 130 (e.g., a monitor or other visual display device) which resource manager 120 controls to display a graphical user interface 150 as explained herein. User 108 provides input commands to control what information (e.g., tables, pop-up screens, etc.) is displayed on display 130.

The graphical user interface 150 configured in accordance with embodiments of the invention includes a first region 160 and a second region 170 on display 130. The first display region 160 includes a hierarchical arrangement of icons 165 (e.g., a hierarchy of vertically disposed icons). The second region 170 includes a table 178, which includes configuration information (e.g., VSANs, zones, etc.) associated with network system 100. Icons illustrated in display 130 represent managed hardware and software entities associated with network 100. As will be explained in more detail shortly, the graphical user interface 150 enables a user 108 of the computer system 110 to select one or more icons (e.g. host resources) from the hierarchical arrangement of icons 165 displayed on the left side of display 130 and display configuration information in table 178 including elements or resources associated with the selected one or more icons in the first display region 160. A user 108 selects one or more of view mode icons 175 to identify what information to display in table 178. In other words, user 108 can use the view mode icons 175 to selectively display resource information in table 178, which is related to the selected icon from hierarchical arrangement of icons 165 in the first region 160 of display 130.

Figure 2:
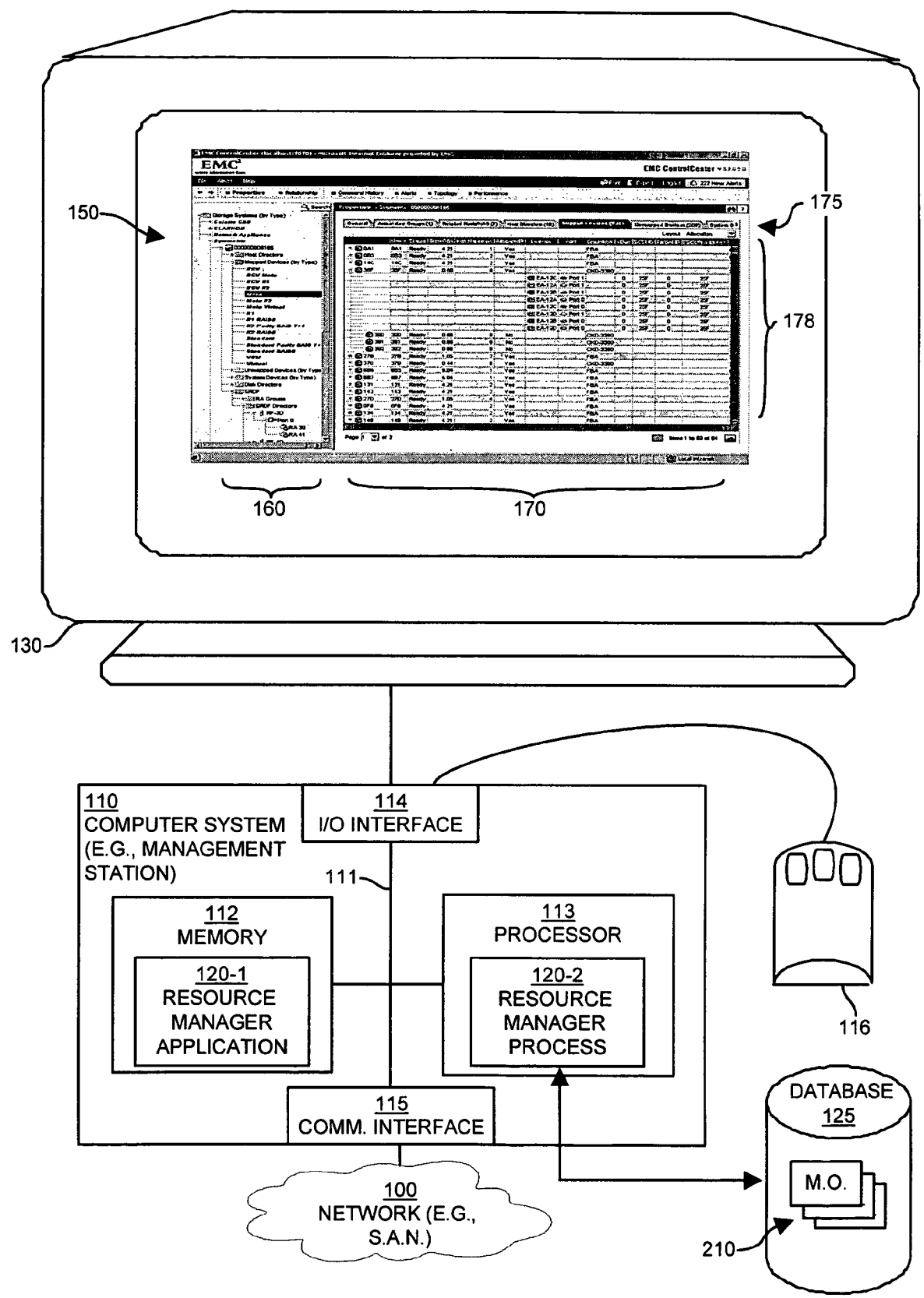
FIG. 2 is a block diagram of a processing device for executing techniques according to an embodiment of the invention.

FIG. 2 is a block diagram illustrating an example architecture of computer system 110 (e.g., a storage area network management station) according to embodiments of the invention. Computer system 110 may be a computerized device such as a personal computer, workstation, portable computing device, console, network terminal or the like. As shown, computer system 110 of the present example includes an interconnect 111 that couples a memory 112, a processor 113, an input/output interface 114 and a communications interface 115. Peripheral device 116 (e.g., one or more viewer controlled devices such as a keyboard, mouse, etc.) couples to processor 113 through I/O interface 114 and enables user 108 to provide input commands and thus control display management functions associated with graphical user interface 150. Database couples to computer system 110. In other embodiments, computer system 110 accesses database 125 over a network. Thus, database 125 and computer system 110 need not be co-located.

In general, database 125 stores managed objects 210 associated with managed entities (e.g., hardware and software resources, configurations, etc. associated with host devices 104, storage resources 102, etc.) in network system 100. Communications interface 115 enables computer system 110 (and corresponding user 108) to communicate with other devices (i.e., resources) associated with network 100.

As shown, memory 112 is encoded with resource manager application 120-1 supporting generation, display, and implementation of functional operations of graphical user interface 150. Resource manager application 120-1 may be embodied as software code such as data and/or logic instructions (e.g., code stored in the memory or on another computer readable medium such as a disk) that supports processing functionality according to different embodiments of the invention as described herein. During operation, processor 113 accesses memory 112 via the interconnect 111 in order to launch, run, execute, interpret or otherwise perform the logic instructions of the resource manager application 120-1. Execution of resource manager application 120-1 produces processing functionality in resource manager process 120-2. In other words, the resource manager process 120-2 represents one or more portions of the resource manager application 120-1 (or the entire application 120-1) performing within or upon the processor 113 in the computerized device 110.

It should be noted that the resource manager 120 executed in computer system 110 is represented in FIG. 2 by either one or both of the resource manager application 120-1 and/or the resource manager process 120-2. For purposes of the discussion of the operation of embodiments of the invention, general reference will be made to the resource manager 120 as performing the various steps and functional operations to carry out the features of embodiments of the invention.

It should be noted that embodiments of the invention include the resource manager application 120-1 itself (i.e., the un-executed or non-performing logic instructions and/or data). The resource manager application 120-1 may be stored on a computer readable medium such as a floppy disk, hard disk or in an optical medium. The resource manager application 120-1 may also be stored in a memory such as firmware, read only memory (ROM), or, as in this example, as executable code within the memory system 112 (e.g., within Random Access Memory).

In addition to these embodiments, it should also be noted that other embodiments of the invention include the execution of resource manager application 120-1 in processor 113 as the resource manager process 120-2. Thus, those skilled in the art will understand that the computer system 110 may include other processes and/or software and hardware components, such as a computer operating system that controls allocation and use of hardware resources.

Display 130 need not be coupled directly to computer system 100. For example, the resource manager 120 can be executed on a remotely accessible computerized device. In this instance, the graphical user interface 150 may be displayed locally to the user, while the resource manager process 120 is executed remotely.

To generate displayed information in graphical user interface 150, the host computer system 110 (e.g., the resource manager process 120-2) extracts information from managed objects 210 stored in database 125. For example, in one embodiment, the resource manager 120 receives an identity of at least one selected network resource (e.g., a storage system) associated with the storage area network. Based on the selected network resource, the resource manager 120 extracts information associated with the managed objects 210 associated with the selected network resource as well as other related managed objects 210 from management database 125. The managed objects 210 store information identifying relationships with other managed objects 210.

As mentioned, graphical user interface 150 generated by resource manager 120 (more particularly, processor 113) provides user 108 the ability to selectively display information associated with a storage system such as a storage area network. For example, based on processing of retrieved information from database 125, the resource manager 120 provides a view (in table 178) of sub-resources associated with a selected one or more resource identified in the first region 160 of display 130.

In one embodiment, computer system 110 extracts information from database 125 using SQL (Structured Query Language) and stores the information in data structures for processing. For example, database 125 contains managed objects 210 (e.g., database records, tables, data structures, etc.) associated with various hardware and software resources or entities associated with network system 100. Computer system 110 utilizes information in the managed objects 210 to identify what resources are related to a selected or more managed resource.

As discussed, database 125 includes managed objects 210 corresponding to network resources in network system 100. More details regarding potential information stored in managed objects 210 will be discussed in connection with FIG. 3.

Figure 3:
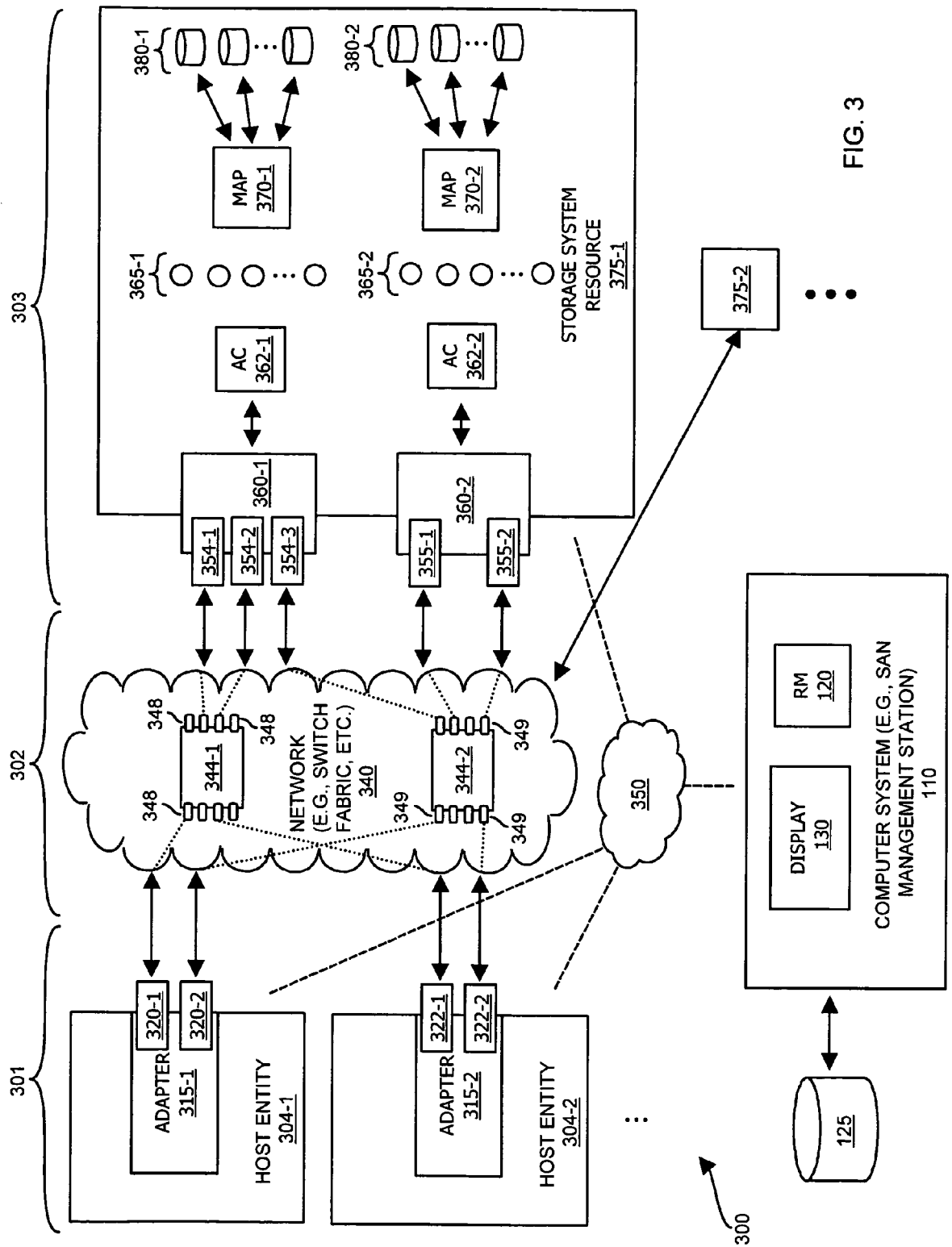
FIG. 3 is a block diagram illustrating a relationship between host resources, switch resources, and storage resources according to an embodiment of the invention.

FIG. 3 is a block diagram illustrating connectivity of network resources (e.g., host resources 301, switch resources 302, and storage resources 303) in a storage area network 300 according to an embodiment of the invention. Note that storage area network 300 can include hundreds or thousands of resources of a particular type due to a potentially enormous size of such an overall storage system.

As shown, storage area network 300 includes host entity 304-1 and host entity 304-2, etc. (collectively, host entities 304), network 340 (e.g., a high speed fiber based switch fabric), network 350 (e.g., LAN, WAN, Internet, intranet, etc.), storage system resource 375-1, storage system resource 375-2, etc., computer system 110, and database 125. Network 340 includes switch device 344-1, switch device 344-2 and corresponding switch ports 348 and 349. Host entity 304-1 includes adapter 315-1 and corresponding port 320-1 and port 320-2 to communicate over network 340. Similarly, host entity 304-2 includes adapter 315-2 and corresponding port 322-1 and port 322-2 to communicate over network 340. Storage system resource 375-1 includes respective adapters 360-1 and 360-2, corresponding ports 354-1, 354-2, 354-3, 355-1 and 355-2, access controllers 362-1 and 362-2, storage devices 365-1 and 365-2, maps 370-1 and 370-2, as well as physical storage devices 380-1 and 380-2. Database 125 stores connectivity information associated with the above components.

As discussed, client devices 105 couple to corresponding host entities 304-1. Storage area network 300 provides host entities 304 (e.g., clients, host computers, etc.) access to storage system resources 375 via network 340. For example, host entity 304-1 couples to network 340 via adapter 315-1 and corresponding ports 320. Ports 320 couple to respective ports 348 and 349 on switch devices 344. In turn, ports 348 and 349 of switch devices 344 couple to ports 354 and 355 of corresponding storage system resources 375. Thus, switch devices 344 and corresponding ports 348 and 349 form at least part of a connection path between host entities 304 and corresponding storage system resources 375. Based on the aforementioned storage system topology, clients 105 are able to access storage system resources through corresponding host entities 304.

Storage system resource 375-1 includes access controllers 362 to facilitate access to corresponding storage devices 365 (e.g., logical storage space in a storage system). Storage devices 365 are configured as logical portions of one or more physical storage devices 380 (e.g., arrays of storage disks). Maps 370 provide a mapping of storage devices 365 (e.g., a logical volume or a portion of a logical volume) to corresponding physical storage devices 380.

Each host entity 304 is typically limited to accessing certain storage devices 365 in storage system resource 375-1 based at least in part on configuration settings of switch devices 344 of network 340. In one embodiment, each of switch ports 348 and 349 are assigned to support a particular SAN in network 340. Host entities 304 associated with the particular SAN access storage system resources 375 via routing through switch devices 344.

Figure 4:
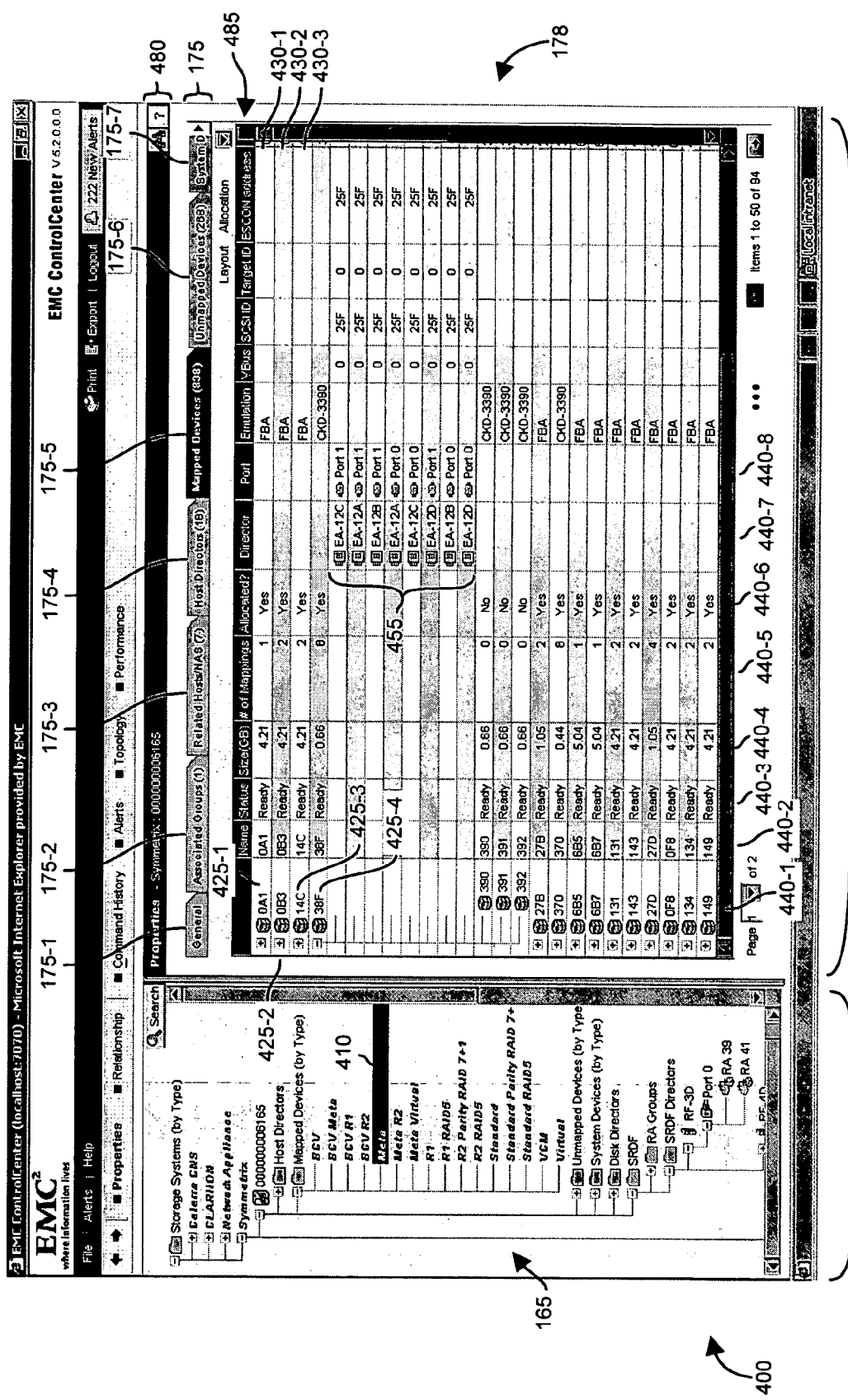
FIG. 4 is a screenshot of a graphical user interface according to an embodiment of the invention.

FIG. 4 is a screenshot 400 on display 130 according to an embodiment of the invention. As shown, first region 160 of screenshot 400 includes a hierarchy of icons 165 representing managed objects 210 (e.g., hardware resources, software resources, configuration information, etc.) associated with storage area network 300 as previously shown and discussed in connection with FIG. 3.

In one embodiment, a user 108 may select "000000006165" under the "Symmetrix"™ storage system icon in expandable tree 165 to produce a display of view mode icons 175. Based on further selection of a view mode icon 175, resource manager 120 produces table 178 populated with corresponding information for viewing by user 108. Header 480 displayed above view mode icons 175 indicates that table 178 and view mode icons 175 pertain to displaying information associated with Symmetrix™ Storage System 000000006165 as selected from expandable tree 165.

In another embodiment as shown, a user 108 clicks on corresponding icons in the hierarchy of icons 165 to expand or minimize different folders. Note that in the example shown, the highlighted icon 410 (i.e., "Meta" under "Mapped Devices" of storage system 000000006165) may not be expanded in first region 160 of display 130. For example, clicking on the "Meta" icon does not cause further sub-resources associated with Meta to be displayed in expandable tree 165. However, activation or selection (e.g., clicking on a an appropriate icon by user 108) of icon 410 prompts resource manager 120 to generate table 178 in the second region 170 of screenshot 400. In this case, resource manager 120 highlights "mapped devices" view mode icon 175-5 to indicate that table 178 displays a corresponding type of resource information.

Table 178 in second region 170 of display 130 includes rows 430 and columns 440 of information associated with the highlighted icon 410. The information in table 178 varies depending on which of multiple viewing modes is selected by user 108 via view mode icons 175. In the example shown, user has selected view mode icon 175-5 (mapped devices). Consequently, table 178 in the second region 170 of display 130 includes "mapped devices" information (e.g., disk space allocated for use by a particular volume) associated with highlighted icon 410.

As discussed, table 178 includes rows 430 and columns 440 to display information related to the highlighted icon 410 to user 108. For example, mapped device 0A1 in row 430-1 has: i) a name=0A1 as indicated in column 440-2, ii) a status=ready as indicated in column 440-3, iii) a size=4.21 Gigabits as indicated in column 440-4, iv) a number of mappings=1 as indicated in column 440-5, etc.

In the example screenshot 400, several columns 440 (e.g., director, port, LUN, etc.) do not include any displayed information for row 430-1. No information is displayed in these fields because the field is not relevant to the entry shown in the row. However, note that certain entries for mapped devices in column 440-1 can be expanded via a corresponding + sign next to an identifier. When such an entry is expanded (i.e., when the + sign of the icon is clicked), related resources associated with the expanded entry appear below the expanded entry in corresponding newly inserted rows in table 178. As shown, icon 425-4 (i.e., 38F) has been expanded to show adapter information 455 associated with the expanded icon 425-4. Note that columns 440 for certain rows are now filled in with information 455. For example, director column 440-7, port column 440-8, Vbus column 440-10, etc. of table 178 are filled in with sub-resource information 455 associated with icon 425-4. Thus, according to one embodiment, table 178 includes a hierarchical tree of expandable resources.

In one embodiment, icons in expandable tree 165 are not expandable in the first display region 160 even though such icons have associated sub-resources that otherwise could be displayed beneath an expanded icon. For example, in one embodiment, hierarchical icon 410 does not include a + sign to support expansion in the expandable tree 165. In this instance of the invention, the user 108 could still select and highlight icon 410. However, expansion of related resources associated with icon 410 is provided in a different viewing region such as table 178 in the second display region 170. One purpose of forcing a user 108 to expand such a folder in the second display region 170 is complexity. The first display region 160 may not lend itself to displaying many sub-resources associated with a selected storage system resource (e.g., highlighted icon 410) nor may it support the filter features as discussed above.

In one embodiment, view mode icons 175 include corresponding identifiers and associated numerical values. The identifiers (e.g., General, Associated Groups, etc. at the top of columns 440) indicate a corresponding type of resource that will be displayed in table 178 for a particular view mode icon 175. The numerical values indicate to the user 108 how many sub-resource entries of a particular type will appear in table 178 as a result of selecting a corresponding view mode icon 175. Thus, a user 108 may get a sense of how many resources shall be displayed in table 178 when clicking on a view mode icon 175.

Figure 5:
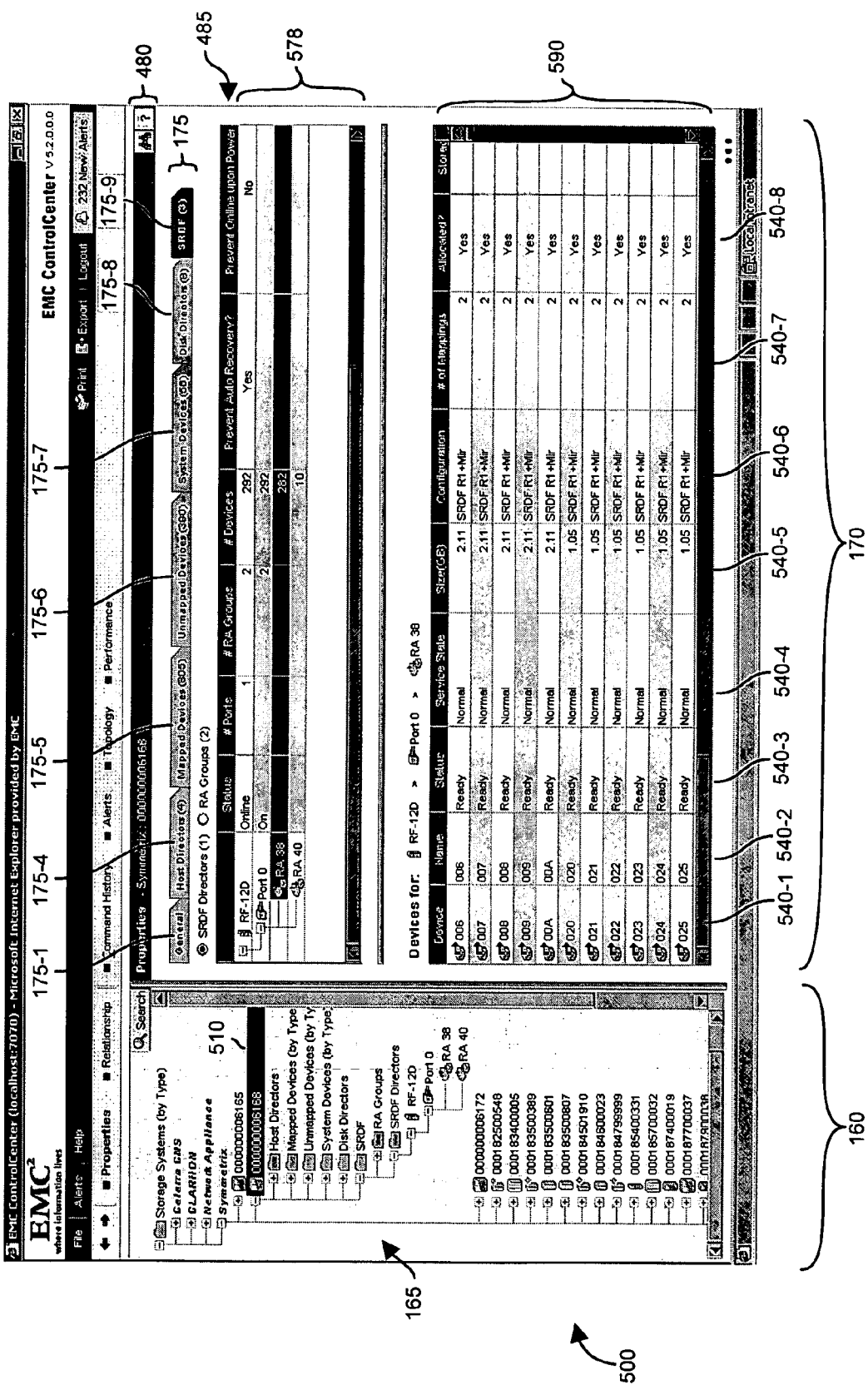
FIG. 5 is a screenshot of a graphical user interface according to an embodiment of the invention.

FIG. 5 is a screenshot 500 of display 130 according to an embodiment of the invention. As shown, screenshot 500 includes many of the features shown in screenshot 400 of FIG. 4. However, screenshot 500 in FIG. 5 illustrates how a user 108 can expand an entry in table 578 to produce table 590 including more detailed information associated with the expanded entry in table 578. For example, a user 108 may select a resource entry such as icon "RA 38" in table 578. In response to the selection, resource manager 120 generates and populates table 590 as shown. The resource manager 120 highlights the resource entry in the table 578 to indicate to which resource the table 590 pertains. For example, as shown in FIG. 5, table 590 includes resource information that pertains to highlighted entry RA 38 in table 578. Thus, a user viewing the display screen 130 can easily identify which entry of the table 578 pertains to contents of the table 590.

Note that in one embodiment, selection of a view mode icon 175 causes resource manager 120 to populate header 485 of columns with different column identifiers. For example, as shown in screenshot 500 of FIG. 5, header 485 of columns in table 578 includes "status", "#ports", "#RA Groups", "#Devices", etc. to identify information in the corresponding columns of table 578. As shown in screenshot 400 of FIG. 4, header 485 of table 178 includes "Name", "Status", "Size (GB)", "# of Mappings", etc. to identify information in the corresponding columns 440. This technique of providing a different header 480 depending on selection of a view mode icon 175 provides a great deal of flexibility when displaying information to a user 108 for viewing because the same table can be used for viewing different types of resources.

General functionality supported by computer system 110 according to embodiments of the invention will now be discussed with respect to flowchart 600 in FIG. 6 as discussed above with respect to FIGS. 1 through 5 above. Note that FIGS. 7-11 include more particular, but related embodiments of the invention. There will be occasional overlap with respect to concepts discussed in the figures.

Figure 6:
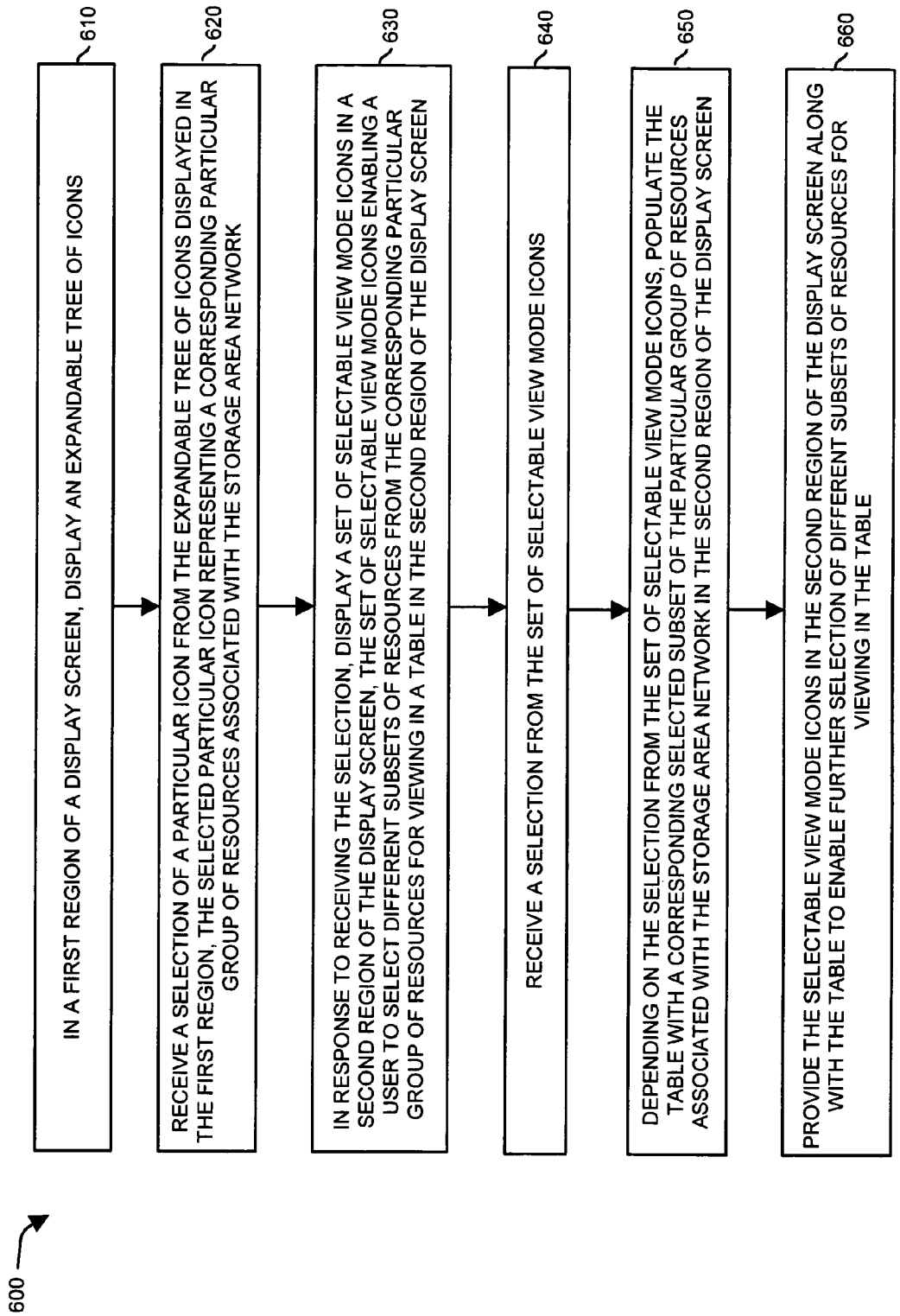
FIG. 6 is a flowchart illustrating a general technique for viewing network resources according to an embodiment of the invention.

FIG. 6 is a flowchart 600 of processing steps performed by resource manager 120 according to an embodiment of the invention. In general, flowchart 500 illustrates how resource manager 120 enables user 108 of the management station computer system 110 to selectively display information associated with storage area network 300. Note that the discussion of FIG. 6 will include occasional references to techniques and features discussed in the previous figures. For illustrative purposes, processor 113 (and more specifically resource manager 120) in computer system 110 in FIG. 2 performs the following operations. However, embodiments of the invention cover the general concepts as recited in the flowcharts, which may be performed by entities other than processor 113.

In view of the aforementioned embodiments, the following embodiments of the invention as in flowchart 600 illustrate techniques for enabling a user 108 to selectively view resources on display 130. For example, as discussed, user 108 selects view mode icons 175 to populate table 178 with appropriate resource information for viewing on display 130.

In step 610, the resource manager 120 (e.g., an application executed by a processor, a processor function, etc.) displays an expandable tree of icons 165 in a first region 160 of a display screen 130. The icons in the expandable tree 165

(FIG. 4) represent managed resources (hardware, software, configuration settings, etc.) associated with a system such as a storage area network.

In step 620, the resource manager 620 receives a selection of a particular icon 410 (e.g., the icon labeled "Meta") from the expandable tree of icons 165 displayed in the first region 160. The selected particular icon 410 represents a corresponding particular group of resources associated with the storage area network (e.g., Symmetrix™ 0000000006165).

In step 630, in response to receiving the selection, the resource manager 120 displays a set of selectable view mode icons 175 in a second region 170 of the display screen 130. The set of selectable view mode icons 175 enables a user to select different subsets of resources from the corresponding particular group of resources (e.g., resources associated with "Meta") in the first region 160 for viewing in a table 178 in the second region 170 of the display screen 130.

In step 640, the resource manager 120 further receives a selection from the set of selectable view mode icons 175 (e.g., "mapped devices" view mode icon 175-5) in the second region 170 of the display screen 130.

In step 650, depending on the selection from the set of selectable view mode icons 175 in the second region 170, the resource manager 120 populates the table 178 in the second region 170 of the display screen 130 with a subset of resources associated with selected icon 410 (e.g., a storage area network or related resource thereof) in the first region 160 of the display screen 130.

In step 660, the resource manager 120 provides the selectable view mode icons 175 in the second region 170 of the display screen 130 along with the table 178 to enable further selection of different subsets of resources for viewing in the table 178. Thus, a first view mode may be selected based on selection of a first icon (e.g., "host directors" view mode icon 175-4) and corresponding type of resource to be viewed; a second view mode may be selected based on selection of a second icon (e.g., "mapped devices" view mode icon 175-5) and corresponding type of resource to be viewed, and so on.

Based on the technique as illustrated by flowchart 600, a user 108 can select a resource entry in the first region 170 of the display screen 130 and click on the view mode icons 175 in the second region 170 to selectively display different resources in the table 178. Simultaneous presentation of the selectable view mode icons 175 (e.g., selectable tabs) along with display of the table 178 provides a unique way of displaying information from an expandable tree 165, enabling a user 108 to further narrow or change which type of resource or sub-resource associated with an initially selected resource in the first region 160 of the display 130 screen shall be expanded for viewing in the table 178 in the second region 170. This overall process of supporting selectable view modes alleviates the user from having to scroll through long lists of managed resources in an expandable tree to identify which resources are important for viewing by the user. Also, the resource manager 120 need only populate an already displayed table to provide any newly requested information to a user viewing the display screen 130 rather than completely change the table 178.

Figure 7:
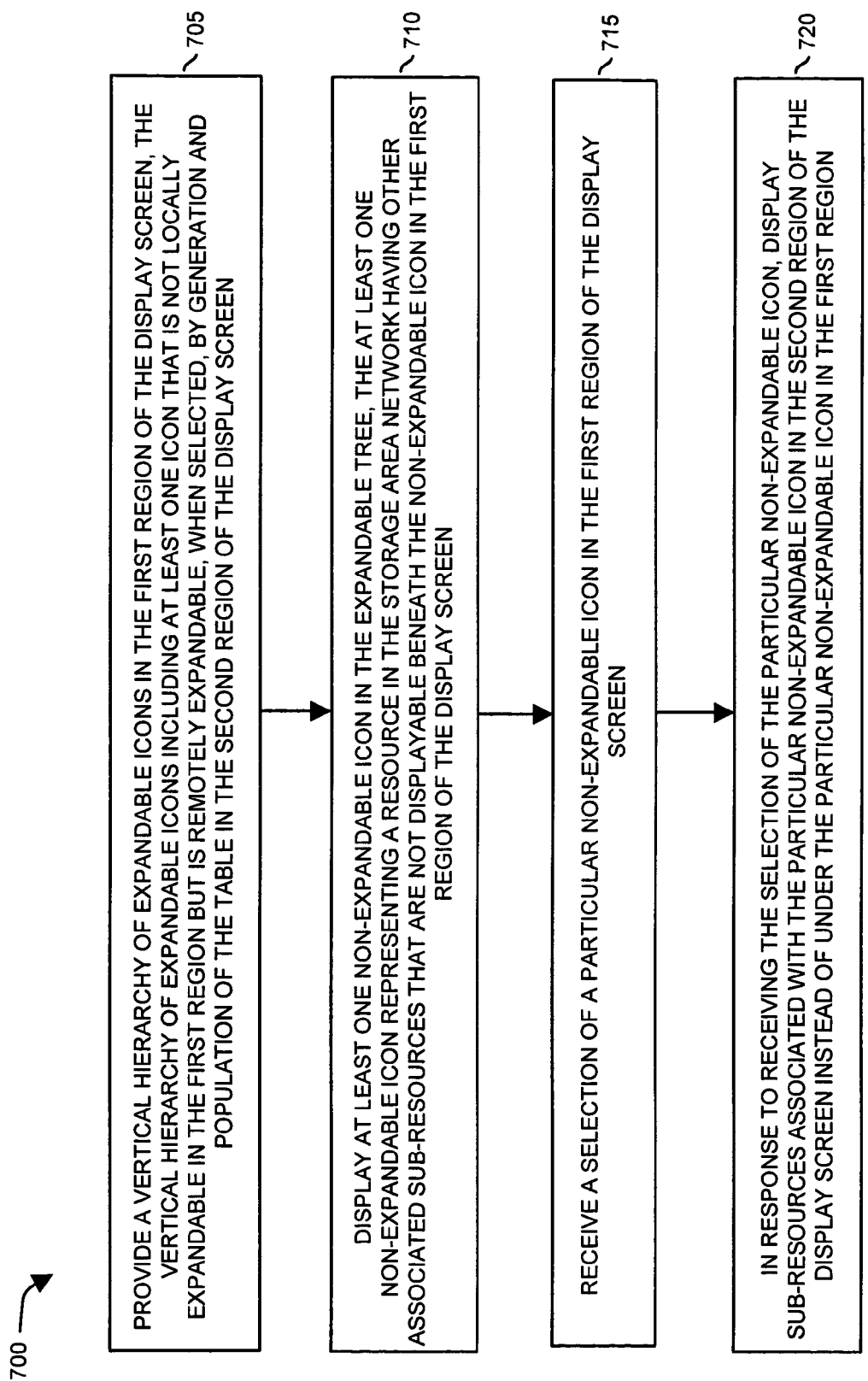
FIG. 7 is a flowchart illustrating another technique for viewing network resources according to an embodiment of the invention.

FIG. 7 is a flowchart 700 of processing steps performed by resource manager 120 according to an embodiment of the invention. Flowchart 700 more particularly illustrates a technique of enabling expansion of a resource selected from expandable tree 165 into table 178 according to an embodiment of the invention.

In step 705, the resource manager provides a vertical hierarchy of expandable icons (e.g., expandable tree 165) in the first region 160 of the display screen 130. The vertical hierarchy of expandable icons includes an icon that is not locally expandable in the first region but is remotely expandable in a second region 170 of the display screen 130. When a particular view mode icon 175 is selected, the resource manager 120 generates and populates the table 178 in the second region 160 of the display screen 130 with corresponding information associated with the selected icon. This simplifies selective viewing of the information because the resource manager 120 displays (e.g., provides exploded view) the information in the second region 160 of the display screen 130 rather than in the expandable tree 165 in the first region 160. Thus, a user 108 can view sub-resources (e.g., contents shown in table 178) associated with a selected resource (e.g., selected icon 410) in a different window than the window from which the resource is originally selected. This renders it easier to view the sub-resources that would otherwise be difficult to view beneath a selected icon 410 in the expandable tree 165 in the first region 170 of the display 130.

In step 710, the resource manager 120 displays a non-expandable icon (e.g., an icon in the first region of the display screen that represents a folder or group of information that does not lend itself to viewing in the first region 160 of the display screen 130) in the expandable tree 165. Selected icon 410 (e.g., Meta) is an example of a non-expandable icon in first region 160 that is expanded remotely in table 178. For example, the selected icon 410 represents a resource in the storage area network having other associated sub-resources that are not displayable beneath the non-expandable icon in the first region 160 of the display screen 130.

In step 715, the resource manager 120 receives a selection of a particular non-expandable icon (e.g., selected icon 410) in the first region 160 of the display screen 130.

In step 720, in response to receiving the selection of the particular non-expandable icon (e.g., selected icon 410) in the first region 160, the resource manager 120 displays sub-resources associated with the particular non-expandable icon in the second region 170 of the display screen 130 instead of under the particular non-expandable icon (e.g., selected icon 410) in the first region 160.

In other embodiments, the table 178 displayed in the second region 170 of the display screen 130 supports additional features to more efficiently display information to a user 108. For example, according to one embodiment, the resource manager 120 provides expandable icons 425 in the table 178 displayed in the second region 170 of the display screen 130. The expandable icons 425 in the table 178 represent at least a portion of the corresponding particular group of resources associated with the selected particular icon 410 in the first region 160 of the display screen 130. Selection of an expandable icon 425 in the table 178, as discussed, results in a further display by the resource manager 120 of a set of additional sub-resources associated with a selected expandable icon 425 in the table 178. As shown in FIG. 4, expandable icon 425 (i.e., "38F") has been expanded to show corresponding directors (in column 440-6) and ports (in column 440-7) in table 178.

Figure 8:
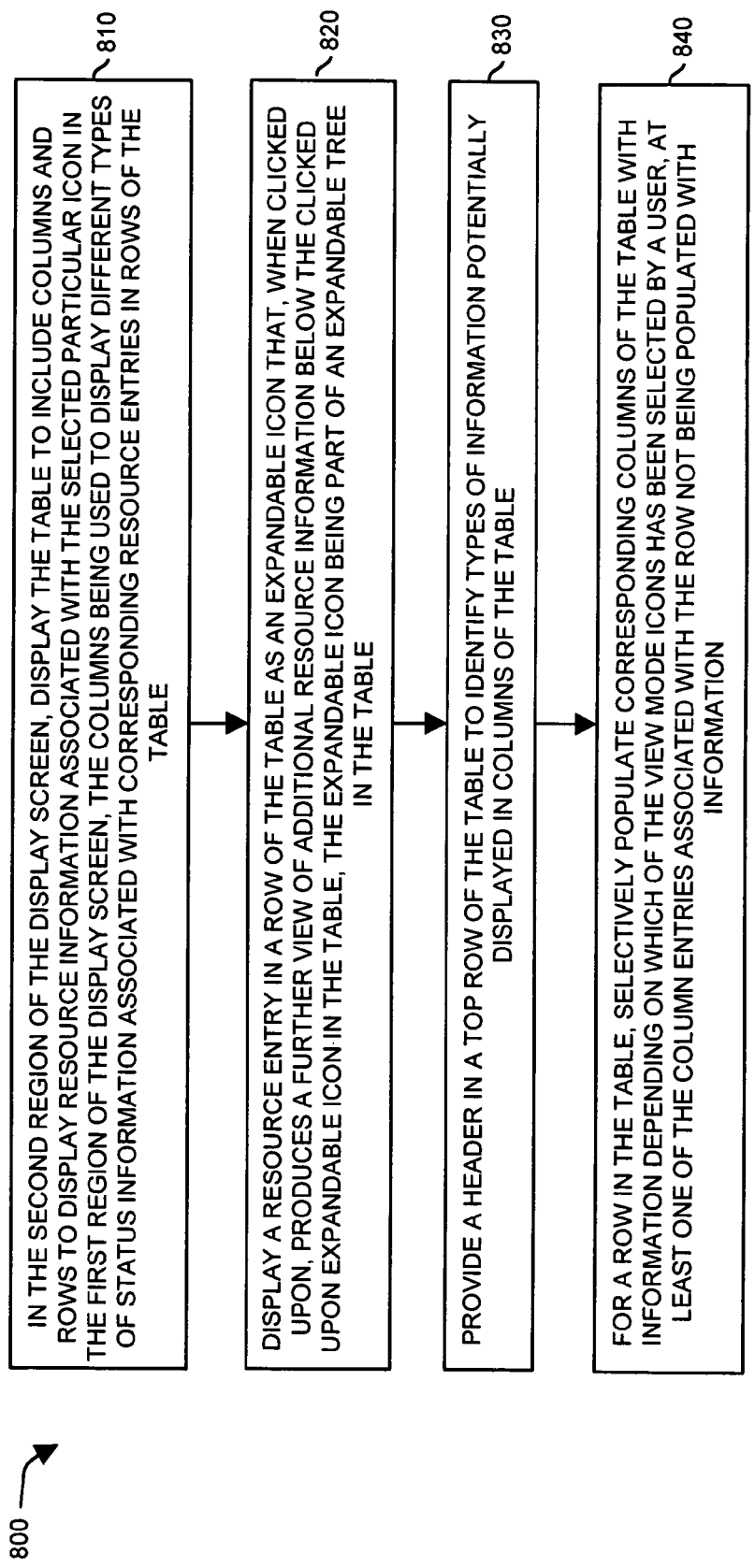
FIG. 8 is a flowchart illustrating a technique for viewing network resources according to an embodiment of the invention.

FIG. 8 is a flowchart 800 of processing steps performed by resource manager 120 according to an embodiment of the invention. Flowchart 800 more particularly illustrates a technique of generating table 178 according to an embodiment of the invention.

In step 810, the resource manager 120 displays the table 178 including columns 440 and rows 430 to display resource information associated with the selected particular icon 410 in the first region 160 of the display screen 130. The resource manager 120 utilizes the columns 440 of the table 178 to display different types of status information associated with corresponding resource entries in rows 430 of the table 178. For example, the columns 440 of the table 178 display different types of status or configuration information associated with a corresponding resource entry in a row of the table 178. Thus, a user 108 can view a particular resource entry in a column 440 of the table 178 and scan across a row 430 of the table 178 to view corresponding information associated with the particular resource entry.

In step 820, the resource manager 120 displays a resource entry in a row 430 of the table 178 as an expandable icon 425 that, when clicked upon, produces a further view of additional resource information below a corresponding selected icon in the row 430 of the table 178. In other words, a column 440 of the table 178 can include a set of expandable icons 425 similar in some respects to icons in the vertical hierarchy of icons 165 as displayed in the first region 160 of the display screen 130.

In step 830, the resource manager 120 provides a header in a top row 430 of the table 178 to identify types of information displayed in columns 440 of the table 178.

In step 840, for a row 430 in the table 178, the resource manager 120 selectively populates corresponding columns 440 of the table 178 with information depending on which of the view mode icons 475 has been selected by a user 108. At least one of the column 440 entries associated with the row 430 is not populated with information for a particular entry because not all column entries 440 are populated with information for a selected view mode. For example, entry "0A1" in column 440-1 does not include an entry of information in "Director" column 440-7, "Port" column 440-8, "Vbus" column 440-10, etc.

Figure 9:
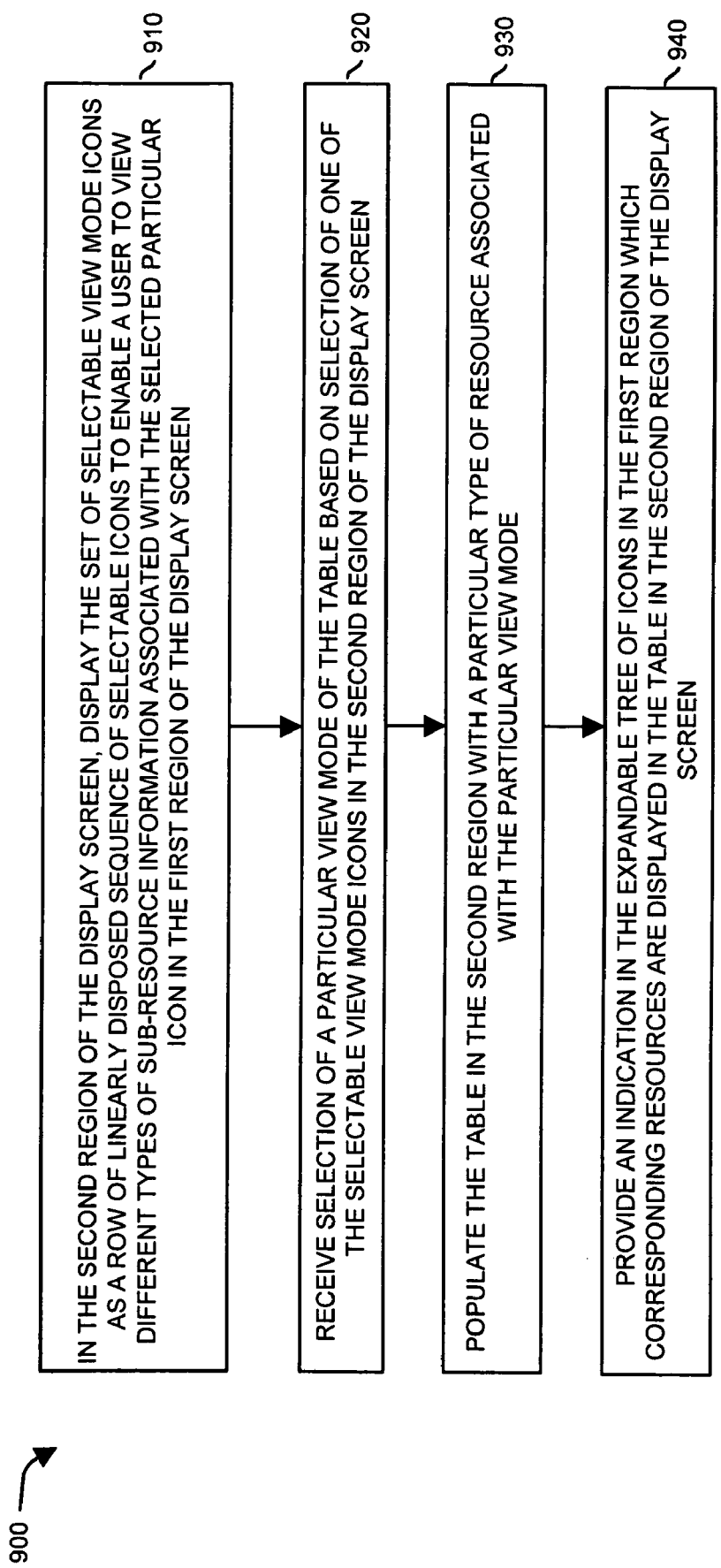
FIG. 9 is a flowchart illustrating a technique for viewing network resources according to an embodiment of the invention.

FIG. 9 is a flowchart 900 of processing steps performed by resource manager 120 according to an embodiment of the invention. Flowchart 900 more particularly illustrates a technique of utilizing selectable view modes according to an embodiment of the invention.

In step 910, the resource manager 910 displays the set of selectable view mode icons 175 as a row of linearly disposed sequence of selectable icons in the second region 170 of the display screen 130 to enable a user to view different types of sub-resource information associated with the selected particular icon 410 in the first region 160 of the display screen 130.

In step 920, the resource manager 120 receives selection of a particular view mode of the table 178 based on selection of one of the selectable view mode icons 175 in the second region 170 of the display screen 130.

In step 930, in response to the selection of the view mode icon 175, the resource manager 120 populates the table 178 in the second region 160 with a particular type of resource associated with the particular view mode.

Figure 10:
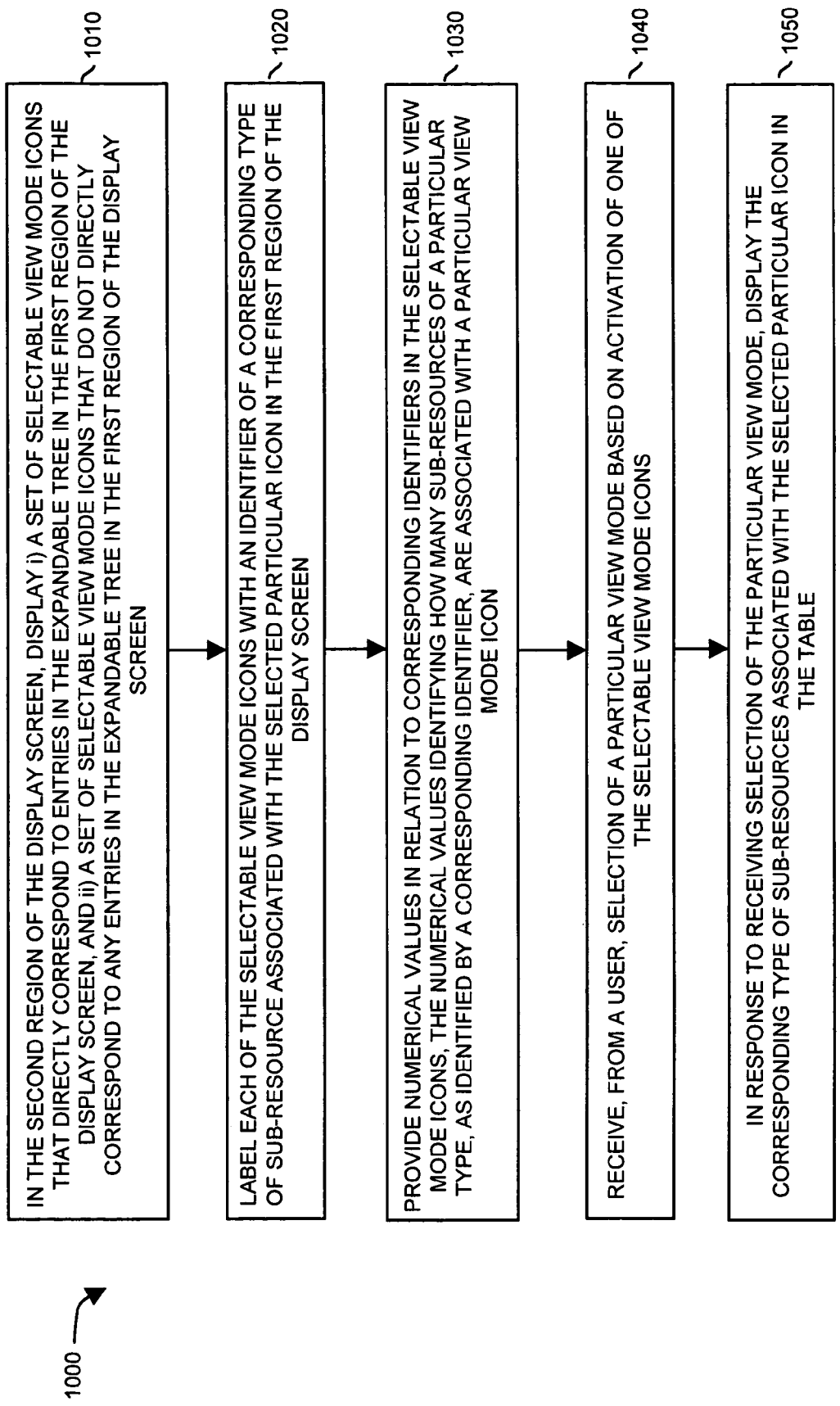
FIG. 10 is a flowchart illustrating a technique for viewing network resources according to an embodiment of the invention.

In step 940, to aid a user 108 viewing the display screen 130 and resource relationships therein, the resource manager 120 provides an indication in the expandable tree of icons 165 in the first region 160 which corresponding resources are displayed in the table 178 in the second region 170 of the display screen 130. For example, selected icon 410 "Meta" is highlighted to indicate that table 178 includes information associated with the selected icon 410. FIG. 10 is a flowchart 1000 of processing steps performed by resource manager 120 according to an embodiment of the invention. Flowchart 1000 more particularly illustrates a technique of displaying additional information associated with the selectable view mode icons 175 according to an embodiment of the invention.

In step 1010, the resource manager 120 displays in the second region 170 of the display screen 130: i) a set of selectable view mode icons 175 that directly correspond to entries in the expandable tree 165 in the first region 160 of the display screen 130, and ii) a set of selectable view mode icons 175 that do not directly correspond to any entries in the expandable tree 165 in the first region 160 of the display screen 130. For example, view mode icon 175-4 (e.g., host directors), view mode icon 175-5 (e.g., mapped devices), view mode icon 175-6 (e.g., unmapped devices), etc. correspond to subfolders Host Directors, Mapped Devices (by type), Unmapped Devices (by type), etc. under icon 0000000006165 in expandable tree 165. View mode icon 175-1 (General), view mode icon 175-2 (Associated Groups), view mode icon 175-3 (Related Hosts/NAS) do not have corresponding folder entries in expandable tree 165.

In step 1020, the resource manager 120 labels each of the selectable view mode icons 175 with an identifier (e.g., General, Associated Groups, Related Hosts/NAS, Host Directors, Mapped Devices, Unmapped Devices, etc.) of a corresponding type of sub-resource associated with the selected particular icon 410 in the first region 160 of the display screen 130. Thus, a user 108 viewing the view mode icons 175 can identify what type of resource shall be displayed in table 178 when clicking on a particular view mode icon 175.

In step 1050, the resource manager 120 also provides numerical values in relation to corresponding identifiers in the selectable view mode icons 175. The numerical values identify how many sub-resources of a particular type, as identified by a corresponding identifier, are associated with a particular view mode icon 175. For example, view mode icon 175-3 has seven related entries, view mode icon 175-4 has eighteen related entries, view mode icon 175-5 has over eight hundred thirty eight entries, and so on. Consequently, a user can quickly review the numerical values displayed on the view mode icons 175 to identify how many sub-resources are associated with corresponding types of resources also identified by the view mode icons 175.

In step 1040, the resource manager 120 receives, from a user 108, selection of a particular view mode based on activation (e.g., clicking by a hand-held mouse) of one of the selectable view mode icons 175.

In step 1050, in response to receiving selection by a user 108 of a particular view mode, the resource manager 120 displays the corresponding type of sub-resources associated with the selected view mode icon 175 in the table 178.

Figure 11:
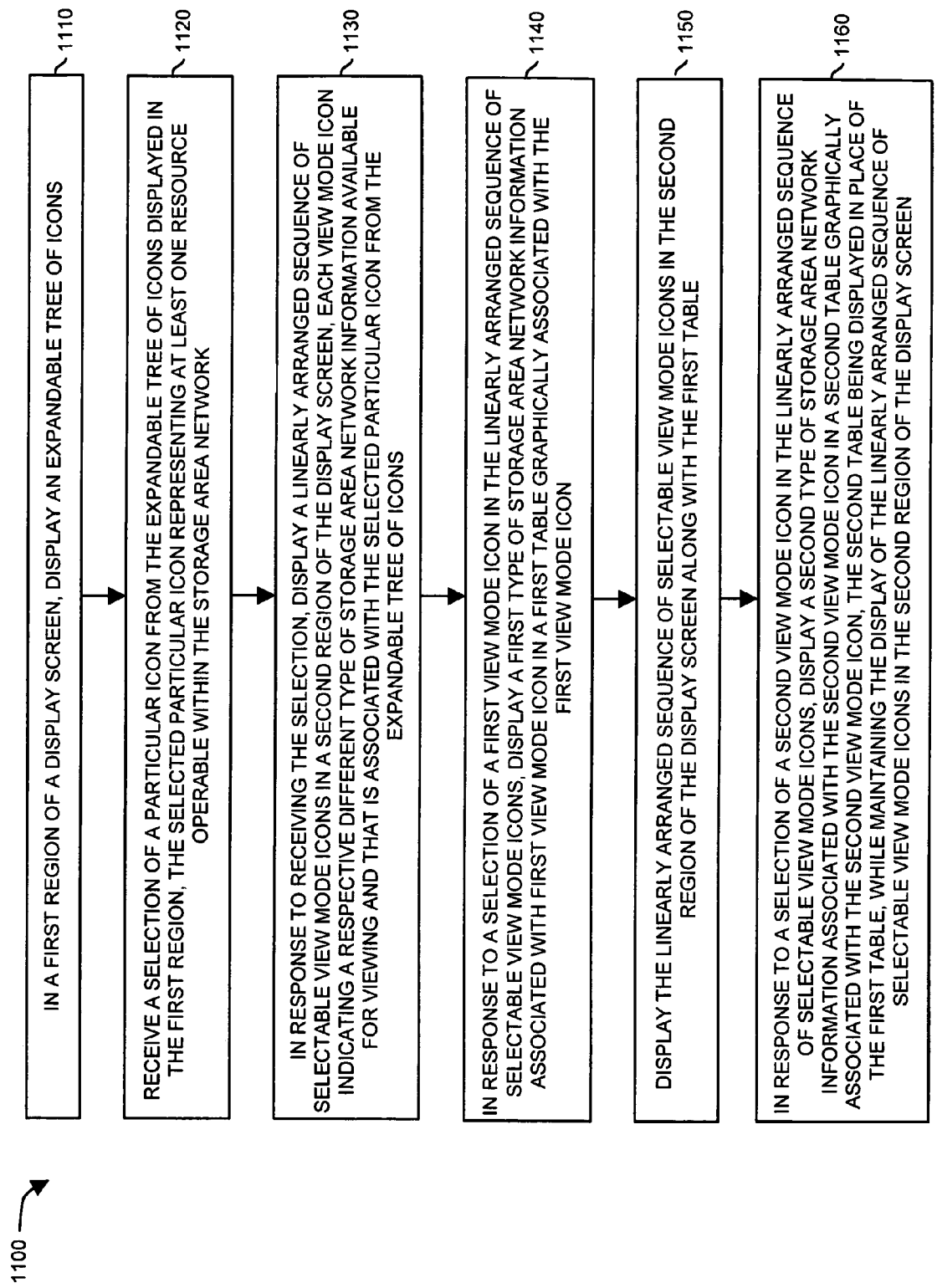
FIG. 11 is a flowchart illustrating a technique for viewing network resources according to an embodiment of the invention.

FIG. 11 is a flowchart 1100 of processing steps performed by resource manager 120 according to an embodiment of the invention to display information associated with the selectable view mode icons 175.

In step 1110, in a first region 160 of a display screen 130, the resource manager 120 displays an expandable tree of icons 165.

In step 1120, the resource manager 120 receives a selection of a particular icon from the expandable tree of icons 165 displayed in the first region 160, the selected particular icon 410 representing at least one resource operable within a storage area network.

In step 1130, in response to receiving the selection, the resource manager 120 displays a linearly arranged sequence of selectable view mode icons 175 in a second region 170 of the display screen 130. Each view mode icon 175 indicates a respective different type of storage area network information available for viewing and that is associated with the selected particular icon 410 from the expandable tree of icons 165 in the first region 160.

In step 1140, in response to a selection of a first view mode icon in the linearly arranged sequence of selectable view mode icons 175, the resource manager 120 displays a first type of storage area network information associated with a first view mode icon in a first table graphically associated with the first view mode icon.

In step 1150, the resource manager 120 also displays the linearly arranged sequence of selectable view mode icons 175 in the second region 170 of the display screen 130 along with the first table 178.

In step 1160, in response to a selection of a second view mode icon in the linearly arranged sequence of selectable view mode icons 175, the resource manager 120 displays a second type of storage area network information associated with the second view mode icon in a second table (e.g., the same table 178 is populated with different information depending on the selected view mode icon 175) graphically associated with the second view mode icon, the second table being displayed in place of the first table. The resource manager 120 maintains the display of the linearly arranged sequence of selectable view mode icons 175 in the second region 170 of the display screen 130, along with the table 178, so that a user 108 may select a different viewing mode and which information is displayed in the table 178.

As discussed, techniques of the invention are well suited for use in applications in which a network manager or user manages a storage area network including many managed resources that are not easily displayed in an expandable hierarchical tree. However, it should be noted that embodiments of the invention are not limited to use in such applications and, thus, embodiments of the invention are well suited for other applications as well.

While this invention has been particularly shown and described with references to preferred embodiments thereof, it will be understood by those skilled in the art that various changes in form and details may be made therein without departing from the spirit and scope of the invention as defined by the appended claims. Such variations are intended to be covered by the scope of this invention. As such, the foregoing description of embodiments of the invention is not intended to be limiting. Rather, any limitations to embodiments of the invention are presented in the following claims.

What is claimed is:

1. A computer-implemented method in which at least one computer executes instructions retrieved from computer storage for providing information associated with a storage area network, the computer-implemented method comprising steps of:
    in a first region of a display screen, displaying an expandable tree of icons;
    receiving a selection of a particular icon from the expandable tree of icons displayed in the first region, the selected particular icon representing a corresponding particular group of resources associated with the storage area network;
    in response to receiving the selection, displaying a linearly arranged sequence of selectable view mode icons in a second region of the display screen, each view mode icon indicating a respective different type of storage area network information available for viewing and that is associated with the selected particular icon from the expandable tree of icons;
    in response to a selection of a first view mode icon in the linearly arranged sequence of selectable view mode icons, displaying a first type of storage area network information associated with first view mode icon in a first table graphically associated with the first view mode icon; and
    displaying the linearly arranged sequence of selectable view mode icons in the second region of the display screen along with the first table;
    in response to a selection of a second view mode icon in the linearly arranged sequence of selectable view mode icons, displaying a second type of storage area network information associated with the second view mode icon in a second table graphically associated with the second view mode icon, the second table being displayed in place of the first table, while maintaining the display of the linearly arranged sequence of selectable view mode icons in the second region of the display screen;
    wherein displaying the set of selectable view mode icons includes: in the second region of the display screen, displaying i) a set of selectable view mode icons that directly correspond to entries in the expandable tree in the first region of the display screen, and ii) a set of selectable view mode icons that do not directly correspond to any entries in the expandable tree in the first region of the display screen; and
    providing different sets of column header information for the first table and the second table, a first set of column header information displayed in the first table to indicate a corresponding type of displayed resource information in the first table and a second set of column header information displayed in the second table to indicate a corresponding type of displayed resource information in the second table.

2. A computer-implemented method as in claim 1 further comprising: providing expandable icons in the first table, the expandable icons in the first table representing at least a portion of the corresponding particular group of resources associated with the selected particular icon in the first region of the display region, selection of an expandable icon resulting in the display of a set of additional sub-resources associated with a selected expandable icon in the first table.

3. A computer-implemented method as in claim 1, wherein displaying an expandable tree of icons in the first region of the display screen includes providing a vertical hierarchy of expandable icons in the first region of the display screen, the vertical hierarchy of expandable icons including at least one icon that is not locally expandable in the first region but is remotely expandable, when selected, by generation and population of the first table in the second region of the display screen.

4. A computer-implemented method as in claim 1 further comprising:
    in the second region of the display screen, displaying the first table to include columns and rows to display resource information associated with the selected particular icon in the first region of the display screen, the columns being used to display different types of status information associated with corresponding resource entries in rows of the first table.

5. A computer-implemented method as in claim 4 further comprising:
    displaying a resource entry in a row of the first table as an expandable icon that, when clicked upon, produces a further view of additional resource information below the clicked upon expandable icon in the first table, the expandable icon being part of an expandable tree in the first table.

6. A computer-implemented method as in claim 1, wherein displaying the expandable tree of icons in the first region includes:
    displaying at least one non-expandable icon in the expandable tree, the at least one non-expandable icon representing a resource in the storage area network having other associated sub-resources that are not displayable beneath the non-expandable icon in the first region of the display screen.

7. A computer-implemented method as in claim 6 further comprising:
   receiving a selection of a particular non-expandable icon in the first region of the display screen;
   in response to receiving the selection of the particular non-expandable icon, displaying sub-resources associated with the particular non-expandable icon in the second region of the display screen instead of under the particular non-expandable icon in the first region.

8. A computer-implemented method as in claim 1 further comprising:
   receiving selection of a particular view mode of the first table based on selection of one of the selectable view mode icons in the second region of the display screen; and
   populating the first table in the second region with a particular type of resource associated with the particular view mode; and
   providing an indication in the expandable tree of icons in the first region which corresponding resources are displayed in the first table in the second region of the display screen.

9. A computer-implemented method as in claim 1 further comprising:
   labeling each of the selectable view mode icons with an identifier of a corresponding type of sub-resource associated with the selected particular icon in the first region of the display screen;
   receiving, from a user, selection of a particular view mode based on activation of one of the selectable view mode icons; and
   in response to receiving selection of the particular view mode, displaying the corresponding type of sub-resources associated with the selected particular icon.

10. A computer-implemented method as in claim 9 further comprising:
    providing numerical values in relation to corresponding identifiers in the selectable view mode icons, the numerical values identifying how many sub-resources of a particular type, as identified by a corresponding identifier, are associated with a particular view mode icon.

11. A computer-implemented method as in claim 1 further comprising:
    providing a header in a top row of the first table to identify types of information potentially displayed in columns of the first table; and
    for a row in the first table, selectively populating corresponding columns of the first table with information depending on which of the view mode icons has been selected by a user, at least one of the column entries associated with the row not being populated with information.

12. A computer-implemented method as in claim 1 further comprising:
    in response to receiving a selection of a resource entry in the first table displayed in the second region, generating a table in a third region of the display screen to display additional resource information associated with the selection of the resource entry of the first table in the second region of the display screen.

13. A computer-implemented method as in claim 12 further comprising:
    highlighting the resource entry in the first table displayed in the second region to indicate to which resource the table in the third region pertains.

14. A computer-implemented method as in claim 1, wherein displaying selectable view mode icons includes:
    in the second region of the display screen, displaying i) a set of selectable view mode icons that directly correspond to entries in the expandable tree in the first region of the display screen, and ii) a set of selectable view mode icons that do not directly correspond to any entries in the expandable tree in the first region of the display screen.

15. A computer-implemented method as in claim 1 further comprising:
    displaying multiple sub-resource folders beneath the particular icon in the expandable tree, each of the multiple sub-resource folders representing a corresponding sub-resource type beneath a resource represented by the particular icon in the expandable tree; and
    labeling each of the selectable view mode icons with a respective identifier, each respective identifier representing a corresponding sub-resource type beneath the particular icon in the expandable tree.

16. A computer-implemented method as in claim 15 further comprising:
    displaying a first numerical value in the first view mode icon, the first numerical value indicating how many resources, of a resource type as indicated by the first view mode icon, are present in the first sub-resource folder; and
    displaying a second numerical value in the second view mode icon, the second numerical value indicating how many resources, of a resource type as indicated by the second view mode icon, are present in the second sub-resource folder.

17. A computer-implemented method as in claim 1 further comprising:
    displaying, in the expandable tree, a first sub-resource folder beneath the particular icon in the expandable tree;
    labeling the first sub-resource folder with a first identifier value, the first identifier value indicating a type of resources in the first sub-resource folder;
    labeling a first view mode icon of the selectable view mode icons in the second region with the first identifier value;
    displaying a second sub-resource folder beneath the particular icon in the expandable tree;
    labeling the second sub-resource folder with a second identifier value, the second identifier value indicating a type of resources in the second sub-resource folder; and
    labeling a second view mode icon of the selectable view mode icons in the second region with the second identifier value.

18. A computer system for displaying management information associated with a storage area network, the computer system comprising:
    a processor;
    a memory unit that stores instructions associated with an application executed by the processor; and
    an interconnect coupling the processor and the memory unit, enabling the computer system to execute the application and perform operations of:
       in a first region of a display screen, displaying an expandable tree of icons;
       receiving a selection of a particular icon from the expandable tree of icons displayed in the first region, the selected particular icon representing a corresponding particular group of resources associated with the storage area network;
       in response to receiving the selection, displaying a linearly arranged sequence of selectable view mode icons in a second region of the display screen, each view mode icon indicating a respective different type of storage area network information available for viewing and that is associated with the selected particular icon from the expandable tree of icons;

in response to a selection of a first view mode icon in the linearly arranged sequence of selectable view mode icons, displaying a first type of storage area network information associated with first view mode icon in a first table graphically associated with the first view mode icon; and displaying the linearly arranged sequence of selectable view mode icons in the second region of the display screen along with the first table;

in response to a selection of a second view mode icon in the linearly arranged sequence of selectable view mode icons, displaying a second type of storage area network information associated with the second view mode icon in a second table graphically associated with the second view mode icon, the second table being displayed in place of the first table, while maintaining the display of the linearly arranged sequence of selectable view mode icons in the second region of the display screen;

wherein displaying the set of selectable view mode icons includes: in the second region of the display screen, displaying i) a set of selectable view mode icons that directly correspond to entries in the expandable tree in the first region of the display screen, and ii) a set of selectable view mode icons that do not directly correspond to any entries in the expandable tree in the first region of the display screen; and providing different sets of column header information for the first table and the second table, a first set of column header information displayed in the first table to indicate a corresponding type of displayed resource information in the first table and a second set of column header information displayed in the second table to indicate a corresponding type of displayed resource information in the second table.

19. A computer system as in claim 18 further supporting operations of: providing expandable icons in the first table, the expandable icons in the first table representing at least a portion of the corresponding particular group of resources associated with the selected particular icon in the first region of the display region, selection of an expandable icon resulting in the display of a set of additional sub-resources associated with a selected expandable icon in the first table.

20. A computer system as in claim 18, wherein displaying an expandable tree of icons in the first region of the display screen includes providing a vertical hierarchy of expandable icons in the first region of the display screen, the vertical hierarchy of expandable icons including at least one icon that is not locally expandable in the first region but is remotely expandable, when selected, by generation and population of the first table in the second region of the display screen.

21. A computer system as in claim 18 further supporting operations of:
in the second region of the display screen, displaying the set of selectable view mode icons as a row of linearly disposed sequence of selectable icons to enable a user to view different types of sub-resource information associated with the selected particular icon in the first region of the display screen.

22. A computer system as in claim 18 further supporting operations of:
in the second region of the display screen, displaying the first table to include columns and rows to display resource information associated with the selected particular icon in the first region of the display screen, the columns being used to display different types of status information associated with corresponding resource entries in rows of the first table.

23. A computer system as in claim 22 further supporting operations of:
displaying a resource entry in a row of the first table as an expandable icon that, when clicked upon, produces a further view of additional resource information below the clicked upon expandable icon in the first table, the expandable icon being part of an expandable tree in the first table.

24. A computer system as in claim 18, wherein displaying the expandable tree of icons in the first region includes:
displaying at least one non-expandable icon in the expandable tree, the at least one non-expandable icon representing a resource in the storage area network having other associated sub-resources that are not displayable beneath the non-expandable icon in the first region of the display screen;

receiving a selection of a particular non-expandable icon in the first region of the display screen; and in response to receiving the selection of the particular non-expandable icon, displaying sub-resources associated with the particular non-expandable icon in the second region of the display screen instead of under the particular non-expandable icon in the first region.

25. A computer system as in claim 18 further supporting operations of:
receiving selection of a particular view mode of the first table based on selection of one of the selectable view mode icons in the second region of the display screen; and populating the first table in the second region with a particular type of resource associated with the particular view mode; and providing an indication in the expandable tree of icons in the first region which corresponding resources are displayed in the first table in the second region of the display screen.

26. A computer system as in claim 18 further supporting operations of:
labeling each of the selectable view mode icons with an identifier of a corresponding type of sub-resource associated with the selected particular icon in the first region of the display screen;

receiving, from a user, selection of a particular view mode based on activation of one of the selectable view mode icons; and in response to receiving selection of the particular view mode, displaying the corresponding type of sub-resources associated with the selected particular icon in the first table;

providing numerical values in relation to corresponding identifiers in the selectable view mode icons, the numerical values identifying how many sub-resources of a particular type, as identified by a corresponding identifier, are associated with a particular view mode icon.

27. A computer system as in claim 18 further supporting operations of:
providing a header in a top row of the first table to identify types of information potentially displayed in columns of the first table; and for a row in the first table, selectively populating corresponding columns of the first table with information depending on which of the view mode icons has been selected by a user, at least one of the column entries associated with the row not being populated with information.

28. A computer system as in claim 18 further supporting operations of:
in response to receiving a selection of a resource entry in the first table displayed in the second region, generating a table in a third region of the display screen to display additional resource information associated with the selection of the resource entry of the first table in the second region of the display screen.

29. A computer system as in claim 28 further supporting operations of:
highlighting the resource entry in the first table displayed in the second region to indicate to which resource the table in the third region pertains.

30. A computer system as in claim 18, wherein displaying the set of selectable view mode icons includes:
in the second region of the display screen, displaying i) a set of selectable view mode icons that directly correspond to entries in the expandable tree in the first region of the display screen, and ii) a set of selectable view mode icons that do not directly correspond to any entries in the expandable tree in the first region of the display screen.

31. A computer-readable storage medium having instructions stored thereon for processing data information, such that the instructions, when carried out by a processing device, enable the processing device to perform the steps of:
in a first region of a display screen, displaying an expandable tree of icons;
receiving a selection of a particular icon from the expandable tree of icons displayed in the first region, the selected particular icon representing a corresponding particular group of resources associated with a storage area network;
in response to receiving the selection, displaying a linearly arranged sequence of selectable view mode icons in a second region of the display screen, each view mode icon indicating a respective different type of storage area network information available for viewing and that is associated with the selected particular icon from the expandable tree of icons;
in response to a selection of a first view mode icon in the linearly arranged sequence of selectable view mode icons, displaying a first type of storage area network information associated with first view mode icon in a first table graphically associated with the first view mode icon; and
displaying the linearly arranged sequence of selectable view mode icons in the second region of the display screen along with the first table;
in response to a selection of a second view mode icon in the linearly arranged sequence of selectable view mode icons, displaying a second type of storage area network information associated with the second view mode icon in a second table graphically associated with the second view mode icon, the second table being displayed in place of the first table, while maintaining the display of the linearly arranged sequence of selectable view mode icons in the second region of the display screen;
wherein displaying the set of selectable view mode icons includes: in the second region of the display screen, displaying i) a set of selectable view mode icons that directly correspond to entries in the expandable tree in the first region of the display screen, and ii) a set of selectable view mode icons that do not directly correspond to any entries in the expandable tree in the first region of the display screen; and
providing different sets of column header information for the first table and the second table, a first set of column header information displayed in the first table to indicate a corresponding type of displayed resource information in the first table and a second set of column header information displayed in the second table to indicate a corresponding type of displayed resource information in the second table.

32. A computer system associated with a storage area network, the computer system providing:
means for displaying an expandable tree of icons in a first region of a display screen;
means for receiving a selection of a particular icon from the expandable tree of icons displayed in the first region, the selected particular icon representing a corresponding particular group of resources associated with the storage area network;
means for displaying a linearly arranged sequence of selectable view mode icons in a second region of the display screen in response to receiving the selection, each view mode icon indicating a respective different type of storage area network information available for viewing and that is associated with the selected particular icon from the expandable tree of icons;
means for displaying a first type of storage area network information associated with first view mode icon in a first table graphically associated with the first view mode icon in response to a selection of a first view mode icon in the linearly arranged sequence of selectable view mode icons;
means for displaying the linearly arranged sequence of selectable view mode icons in the second region of the display screen along with the first table;
means for displaying a second type of storage area network information associated with the second view mode icon in a second table graphically associated with the second view mode icon in response to a selection of a second view mode icon in the linearly arranged sequence of selectable view mode icons, the second table being displayed in place of the first table, while maintaining the display of the linearly arranged sequence of selectable view mode icons in the second region of the display screen;
wherein displaying the set of selectable view mode icons includes: in the second region of the display screen, displaying i) a set of selectable view mode icons that directly correspond to entries in the expandable tree in the first region of the display screen, and ii) a set of selectable view mode icons that do not directly correspond to any entries in the expandable tree in the first region of the display screen; and
means for providing different sets of column header information for the first table and the second table, a first set of column header information displayed in the first table to indicate a corresponding type of displayed resource information in the first table and a second set of column header information displayed in the second table to indicate a corresponding type of displayed resource information in the second table.

* * * * *